(12) United States Patent
Moffitt

(10) Patent No.: US 12,551,702 B2
(45) Date of Patent: Feb. 17, 2026

(54) SELECTIVE STIMULATION OF PERIPHERAL NERVES

(71) Applicant: Boston Scientific Neuromodulation Corporation, Valencia, CA (US)

(72) Inventor: Michael Moffitt, Solon, OH (US)

(73) Assignee: Boston Scientific Neuromodulation Corporation, Valencia, CA (US)

( * ) Notice: Subject to any disclaimer, the term of this patent is extended or adjusted under 35 U.S.C. 154(b) by 767 days.

(21) Appl. No.: 17/759,731

(22) PCT Filed: Feb. 2, 2021

(86) PCT No.: PCT/US2021/016239
§ 371 (c)(1),
(2) Date: Jul. 29, 2022

(87) PCT Pub. No.: WO2021/167783
PCT Pub. Date: Aug. 26, 2021

(65) Prior Publication Data
US 2023/0064552 A1    Mar. 2, 2023

Related U.S. Application Data

(60) Provisional application No. 62/979,912, filed on Feb. 21, 2020.

(51) Int. Cl.
*A61N 1/36* (2006.01)
*A61N 1/05* (2006.01)

(52) U.S. Cl.
CPC ........ *A61N 1/36139* (2013.01); *A61N 1/0556* (2013.01); *A61N 1/0558* (2013.01)

(58) Field of Classification Search
CPC .............. A61N 1/36139; A61N 1/0556; A61N 1/0558; A61N 1/36053; A61N 1/36135;
(Continued)

(56) References Cited

U.S. PATENT DOCUMENTS

| | | |
|---|---|---|
| 6,181,969 B1 | 1/2001 | Gord |
| 6,875,176 B2 | 4/2005 | Mourad et al. |

(Continued)

FOREIGN PATENT DOCUMENTS

| | | |
|---|---|---|
| EP | 2101872 B1 | 10/2013 |
| WO | 2019/032890 | 2/2019 |

(Continued)

OTHER PUBLICATIONS

Ferrari, Marco, et al., "Principles, Techniques, and Limitations of Near Infrared Spectroscopy," Can. J. Appl. Physiol. 29(4), pp. 463-487, 2004.

(Continued)

*Primary Examiner* — Mark W. Bockelman
(74) *Attorney, Agent, or Firm* — Lewis & Reese, PLLC

(57) ABSTRACT

Methods and systems for providing peripheral nerve stimulation are disclosed. Stimulation is delivered to a trunk of the nerve using electrodes configured at different circumferential locations about the nerve. Action potentials evoked by the stimulation within branches of the nerve are measured to map neural element within the trunk to the branches. The mapping can inform the selection of stimulation parameters that provide a therapeutic benefit and/or avoid unwanted side effects.

15 Claims, 15 Drawing Sheets

(58) Field of Classification Search
CPC ............ A61N 1/36182; A61N 1/37247; A61N 1/0551
See application file for complete search history.

(56) References Cited

U.S. PATENT DOCUMENTS

| | | |
|---|---|---|
| 6,998,247 B2 | 2/2006 | Monfre et al. |
| 7,016,717 B2 | 3/2006 | Demos et al. |
| 7,346,382 B2 | 3/2008 | McIntyre et al. |
| 7,435,229 B2 | 10/2008 | Wolf |
| 7,596,414 B2 | 9/2009 | Whitehurst et al. |
| 7,742,810 B2 | 6/2010 | Moffitt et al. |
| 7,783,362 B2 | 8/2010 | Whitehurst et al. |
| 7,974,706 B2 | 7/2011 | Moffitt et al. |
| 8,406,838 B2 | 3/2013 | Kato |
| 8,423,157 B2 | 4/2013 | Moffitt et al. |
| 8,478,428 B2 | 7/2013 | Cowley |
| 8,509,919 B2 | 8/2013 | Yoo et al. |
| 8,606,362 B2 | 12/2013 | He et al. |
| 8,620,436 B2 | 12/2013 | Parramon et al. |
| 9,326,725 B2 | 5/2016 | Finkel et al. |
| 9,867,989 B2 | 1/2018 | Blum et al. |
| 2003/0139667 A1 | 7/2003 | Hewko et al. |
| 2007/0288064 A1 | 12/2007 | Butson et al. |
| 2008/0139908 A1 | 6/2008 | Kurth |
| 2009/0062685 A1 | 3/2009 | Bergethon et al. |
| 2009/0088660 A1 | 4/2009 | McMorrow |
| 2009/0287271 A1 | 11/2009 | Blum et al. |
| 2010/0331926 A1 | 12/2010 | Lee et al. |
| 2012/0092031 A1 | 4/2012 | Shi et al. |
| 2012/0095519 A1 | 4/2012 | Parramon et al. |
| 2012/0095529 A1 | 4/2012 | Parramon et al. |
| 2012/0303087 A1 | 11/2012 | Moffitt et al. |
| 2013/0289665 A1 | 10/2013 | Marnfeldt et al. |
| 2015/0080982 A1 | 3/2015 | Funderburk |
| 2015/0157861 A1 | 6/2015 | Aghassian |
| 2015/0231402 A1 | 8/2015 | Aghassian |
| 2018/0071520 A1 | 3/2018 | Weerakoon et al. |
| 2018/0071527 A1 | 3/2018 | Feldman et al. |
| 2018/0140831 A1 | 5/2018 | Feldman et al. |
| 2019/0083796 A1 | 3/2019 | Weerakoon et al. |
| 2020/0029894 A1 | 1/2020 | Gerber et al. |

FOREIGN PATENT DOCUMENTS

| | | |
|---|---|---|
| WO | 2019/122819 | 6/2019 |
| WO | 2019/204884 | 10/2019 |

OTHER PUBLICATIONS

Szeles, J. Constantin, et al., "Objectivation of Cerebral Effects with a New Continuous Electrical Auricular Stimulation Technique for Pain Management," Neurological Research, vol. 26, pp. 797-800, Oct. 2004.

Coffey, Emily B.J., et al., Measuring Workload Using a Combination of Electroencephalography and Near Infrared Spectroscopy, Proceedings of the Human Factors and Ergonomics Society 56$^{th}$ Annual Meeting, pp. 1822-1826, 2012.

Invitation to Pay Additional Fees regarding corresponding PCT Application No. PCT/US2021/016239, mailed May 26, 2021.

International Search Report and Written Opinion regarding corresponding PCT Application No. PCT/US2021/016239, mailed Jul. 19, 2021.

Extended Search Report regarding corresponding European Patent Application No. 24181488.8, mailed Oct. 2, 2024.

SELECTIVE STIMULATION OF PERIPHERAL NERVES

FIELD OF THE INVENTION

This application relates to methods and systems for peripheral nerve stimulation, and more particularly to user interfaces to facilitate selection of peripheral nerves for stimulation.

INTRODUCTION

Stimulation of peripheral/cranial nerves is sometimes used to treat disorders, including central nervous system disorders. For example, vagus nerve stimulation (VNS) has been applied to treat epilepsy and depression. Stimulation of cranial nerves, including the vagus nerve, may also be useful for the treatment of Alzheimer's disease and other dementias.

The vagus nerve 100, illustrated in FIG. 1, provides the primary parasympathetic nerve to the thoracic organs and most of the abdominal organs. It originates in the brainstem and runs in the neck through the carotid sheath with jugular vein and common carotid artery 106, and then adjacent to the esophagus to the thoracic and abdominal viscera. The vagus nerve comprises multiple fascicles and has many branches, including pharyngeal and laryngeal branches 102, cardiac branches 104, pulmonary branches, esophageal branches, gastric branches, and pancreaticoduodenal branches. The vagus nerve also has several upstream branches, for example, directed to medullary targets, including the dorsal nucleus of the vagus, nucleus ambiguous, solitary nucleus, and the spinal trigeminal nucleus. The vagus nerve supports both efferent and afferent activity.

Because the vagus nerve innervates the pharynx, the most common side effect associated with VNS therapy is difficulty speaking (dysarthria), such as a hoarse voice during stimulation. Some patients also experience a mild cough, tickling in the back of the pharynx, or increased hoarseness. Stimulation of the vagus nerve may also lead to a decreased opening of the vocal cords, which results in shortness of breath during exertion. The vagus nerve provides parasympathetic innervation to the heart, and stimulation of the vagus nerve has been demonstrated to cause bradycardia and arrhythmias. Also, the vagus nerve provides parasympathetic innervation to the lungs and most of the abdominal organs (e.g., the stomach and small intestine), and improper stimulation of the vagus nerve may impair proper functioning of these organs.

Because of the complex anatomy of the vagus nerve, knowing which portion of the nerve to stimulate for therapeutic effect and which portion not to stimulate due to side effects can be challenging. Thus, there is a need for methods and systems for mapping and calibrating the relationship of stimulation locations and relevant nerve anatomy where and how to stimulate the nerve to achieve a desired therapeutic response.

SUMMARY

Disclosed herein is a method of stimulating a peripheral nerve, the peripheral nerve comprising a trunk and a plurality of branches, the method comprising: delivering electrical stimulation to the trunk using one or more of a plurality of trunk electrodes, wherein the plurality of trunk electrodes comprises at least two trunk electrodes configured at different circumferential locations about the trunk, wherein delivering the electrical stimulation comprises: delivering a first electrical stimulation that selectively recruits a first population of neural elements within the trunk, and delivering a second electrical stimulation that selectively recruits a second population of neural elements within the trunk, recording action potentials evoked by the first and second electrical stimulations at at least one of the plurality of branches, and determining an amount of coupling of the first population of neural elements and the second population of neural elements with the at least one branch based on the sensed action potentials. According to some embodiments, the plurality of trunk electrodes comprises at least three trunk electrodes each configured at different circumferential locations about the trunk. According to some embodiments, the first electrical stimulation and the second electrical stimulation are each delivered at different circumferential locations about the trunk. According to some embodiments, recording action potentials at at least one of the plurality of branches comprises recording action potentials at two or more branches. According to some embodiments, recording action potentials at at least one of the plurality of branches comprises sensing electrical potentials at least one of the plurality of branches using one or more branch electrodes. According to some embodiments, the one or more branch electrodes comprise percutaneous electrodes, implanted electrodes, or transdermal electrodes. According to some embodiments, delivering either, or both of, the first and second electrical stimulations comprises using current steering to deliver electrical stimulation at a location between at least two trunk electrodes. According to some embodiments, the plurality of trunk electrodes further comprises at least two electrodes at different longitudinal locations along the trunk. According to some embodiments, the plurality of trunk electrodes comprises: a first longitudinal set of electrodes configured at a first longitudinal location along the trunk, a second longitudinal set of electrodes configured at a second longitudinal location along the trunk, and a third longitudinal set of electrodes configured at a third longitudinal location along the trunk. According to some embodiments, delivering either, or both of, the first and second electrical stimulations comprises: selecting an electrode of the first longitudinal set of electrodes as a first local anode, selecting an electrode of the second longitudinal set of electrodes as a second local anode, and selecting an electrode of the third longitudinal set of electrodes as a local cathode, sourcing electrical current from the two local anodes into a target neural region of the trunk, sinking a first portion of the electrical current from the target neural region into the local cathode, and sinking a second portion of the electrical current into at least one cathode remote from the target neural region. According to some embodiments, a ratio of the sourced electrical current over the first portion of the sunk electrical current has a value that allows the first population of neural elements or the second population of neural elements to be recruited.

Also disclosed herein is a method of stimulating a peripheral nerve, the peripheral nerve comprising a trunk and a plurality of branches, wherein stimulation that activates a first branch of the plurality of branches provides a therapeutic benefit and stimulation that activates a second branch of the plurality of branches results in an unwanted side effect, the method comprising: mapping a correlation between neural elements in the trunk with neural elements in the first and second branches to determine a first population of neural elements in the trunk associated with the first branch and a second population of neural elements in the trunk associated with the second branch, and delivering therapeutic electrical stimulation to the trunk using one or more of a plurality of trunk electrodes, wherein the plurality of trunk electrodes comprises at least two trunk electrodes configured at different circumferential locations about the trunk, and wherein the electrical stimulation selectively recruits the first population of neural elements. According to some embodiments, the mapping comprises: delivering a first test stimulation at the first branch, recording action potentials evoked in the first population of neural elements in the trunk using a first one or more of the trunk electrodes, delivering a second test stimulation in the second branch, recording action potentials evoked in the second population of neural elements in the trunk using a second one or more of the trunk electrodes, and determining circumferential locations of the first and second neural elements in the trunk based on the circumferential locations of the first and second one or more trunk electrodes. According to some embodiments, the mapping comprises: delivering a first test stimulation at a first circumferential location about the trunk, recording action potentials evoked by the first test stimulation in the first and second branches, delivering a second test stimulation at a second circumferential location about the trunk, recording action potentials evoked by the second test stimulation in the first and second branches, and determining circumferential locations of the first and second neural elements in the trunk based on the action potentials evoked by the first and second test stimulations in each of the branches. According to some embodiments, recording action potentials evoked at the first and second branches comprises sensing electrical potentials using branch electrodes configured at the first and second branches. According to some embodiments, the one or more branch electrodes comprise percutaneous electrodes, implanted electrodes, or transdermal electrodes. According to some embodiments, the method further comprises delivering one or more hyperpolarizing pre-pulses to the trunk that renders the second population of neural elements less excitable. According to some embodiments, the plurality of trunk electrodes comprises: a first longitudinal set of electrodes configured at a first longitudinal location along the trunk, a second longitudinal set of electrodes configured at a second longitudinal location along the trunk, and a third longitudinal set of electrodes configured at a third longitudinal location along the trunk. According to some embodiments, delivering the therapeutic electrical stimulations comprises: selecting an electrode of the first longitudinal set of electrodes as a first local anode, selecting an electrode of the second longitudinal set of electrodes as a second local anode, and selecting an electrode of the third longitudinal set of electrodes as a local cathode, sourcing electrical current from the two local anodes into a target neural region of the trunk, sinking a first portion of the electrical current from the target neural region into the local cathode, and sinking a second portion of the electrical current into at least one cathode remote from the target neural region. According to some embodiments, a ratio of the sourced electrical current over the first portion of the sunk electrical current has a value that allows the first population of neural elements or the second population of neural elements to be recruited.

Also disclosed herein is a system for electrically stimulating a peripheral nerve, the peripheral nerve comprising a trunk and a plurality of branches, the system comprising: control circuitry configured to: send instructions to a stimulation device to deliver electrical stimulation to the trunk using one or more of a plurality of trunk electrodes, wherein the plurality of trunk electrodes comprises at least two trunk electrodes configured at different circumferential locations about the trunk, wherein delivering the electrical stimulation comprises: delivering a first electrical stimulation that selectively recruits a first population of neural elements within the trunk, and delivering a second electrical stimulation that selectively recruits a second population of neural elements within the trunk, record action potentials evoked by the first and second electrical stimulations at at least one of the plurality of branches, and determine an amount of coupling of the first population of neural elements and the second population of neural elements with the at least one branch based on the sensed action potentials.

Also disclosed herein is a method of stimulating a peripheral nerve using a plurality of electrodes configured on or near the peripheral nerve, wherein the plurality of electrodes comprises at least a first longitudinal set of electrodes configured at a first circumferential location about the nerve and a second longitudinal set of electrodes configured at a second circumferential location about the nerve, wherein each of the first and second longitudinal sets of electrodes comprise at least three longitudinally distributed electrodes, the method comprising: selecting one of the longitudinal sets of electrodes, selecting an electrode of the first longitudinal set of electrodes as a first local anode, selecting an electrode of the second longitudinal set of electrodes as a second local anode, and selecting an electrode of the third longitudinal set of electrodes as a local cathode, sourcing electrical current from the two local anodes into a target neural region of the trunk, sinking a first portion of the electrical current from the target neural region into the local cathode, and sinking a second portion of the electrical current into at least one cathode remote from the target neural region.

Also disclosed herein is a system for optimizing stimulation parameters for a patient receiving electrical stimulation therapy, the system comprising: an external controller comprising control circuitry configured to send instructions to a stimulation device implantable in a patient, the stimulation device the external controller is configured to: instruct the implantable stimulator to stimulate the patient for a time period, during the time period, periodically receive indications of the patient's cognitive function, determine a change in the indications during the time period, and adjust the stimulation based on the change in the indications. According to some embodiments, the indications of the patient's cognitive function comprise quantitative metric values determined based on one or more cognitive tests administered to the patient. According to some embodiments, the system further comprises an assessment apparatus configured to administer the one or more cognitive tests to the patient. According to some embodiments, the time period comprises more than one day. According to some embodiments, the time period comprises more than one week.

Also disclosed herein is an external programmer for use with an implantable medical device, wherein the implantable medical device comprises an implantable pulse generator (IPG) and two or more electrodes configurable at different circumferential locations about a patient's nerve, the external programmer comprising: a display, and control circuitry configured to: provide a user interface (UI) on the display, wherein the UI comprises a representation of the nerve, a representation of the two or more electrodes, and control elements for selecting stimulation parameters for electrically stimulating the nerve, receive, via input to the UI, a selected set of stimulation parameters, determine a population of neural elements within the nerve that will be recruited by stimulation using the selected stimulation parameters, and indicate the population on the representation of the nerve. According to some embodiments, determining a population of neural elements within the nerve that will be recruited by stimulation comprises determining an electric field created in the nerve by the stimulation. According to some embodiments, determining a population of neural elements within the nerve that will be recruited by stimulation comprises determining a volume of activation created in the nerve by the stimulation. According to some embodiments, the control elements for selecting stimulation parameters comprise control elements for selecting a radial position about the nerve at which to provide stimulation. According to some embodiments, the control elements for selecting stimulation parameters comprise control elements for selecting a radial focus of the stimulation. According to some embodiments, the control elements for selecting stimulation parameters comprise control elements for selecting anode intensification. According to some embodiments, determining a population of neural elements within the nerve that will be recruited by stimulation comprises determining fiber sizes of the neural elements that will be recruited by stimulation. According to some embodiments, the control circuitry is further configured to provide the selected set of stimulation parameters to the IPG. According to some embodiments, the UI further comprises control elements for inputting an indication of one or more clinical effects evoked in the patient by the stimulation. According to some embodiments, the UI is configured to display a clinical effects map correlating the one or more clinical effects with the neural elements recruited by the stimulation.

Also disclosed herein is a system for providing stimulation to a peripheral nerve of a patient, the system comprising: one or more electrode leads, wherein each electrode lead is configured to be placed, at least partially, around the nerve, each of the electrode leads comprising two or more electrodes configured such that each electrode is at a different circumferential location about the nerve, an implantable pulse generator (IPG) configured to provide electrical stimulation to the electrodes, and an external programmer comprising: a display, and control circuitry configured to: provide a user interface (UI) on the display, wherein the UI comprises a representation of the nerve, a representation of the two or more electrodes, and control elements for selecting stimulation parameters for electrically stimulating the nerve, receive, via input to the UI, a selected set of stimulation parameters, determine a population of neural elements within the nerve that will be recruited by stimulation using the selected stimulation parameters, and indicate the population on the representation of the nerve. According to some embodiments, determining a population of neural elements within the nerve that will be recruited by stimulation comprises determining an electric field created in the nerve by the stimulation. According to some embodiments, determining a population of neural elements within the nerve that will be recruited by stimulation comprises determining a volume of activation created in the nerve by the stimulation. According to some embodiments, the control elements for selecting stimulation parameters comprise control elements for selecting a radial position about the nerve at which to provide stimulation. According to some embodiments, the control elements for selecting stimulation parameters comprise control elements for selecting a radial focus of the stimulation. According to some embodiments, the control elements for selecting stimulation parameters comprise control elements for selecting anode intensification. According to some embodiments, determining a population of neural elements within the nerve that will be recruited by stimulation comprises determining fiber sizes of the neural elements that will be recruited by stimulation. According to some embodiments, the control circuitry is further configured to provide the selected set of stimulation parameters to the IPG. According to some embodiments, the UI further comprises control elements for inputting an indication of one or more clinical effects evoked in the patient by the stimulation. According to some embodiments, the UI is configured to display a clinical effects map correlating the one or more clinical effects with the neural elements recruited by the stimulation. According to some embodiments, the peripheral nerve is a vagus nerve. According to some embodiments, the one or more electrode leads comprise cuff electrode leads. According to some embodiments, the one or more electrode leads comprise helical electrode leads.

The invention may also reside in the form of a programed external device (via its control circuitry) for carrying out the above methods, a programmed IPG or ETS (via its control circuitry) for carrying out the above methods, a system including a programmed external device and IPG or ETS for carrying out the above methods, or as a computer readable media for carrying out the above methods stored in an external device or IPG or ETS.

DETAILED DESCRIPTION

Figure 2:
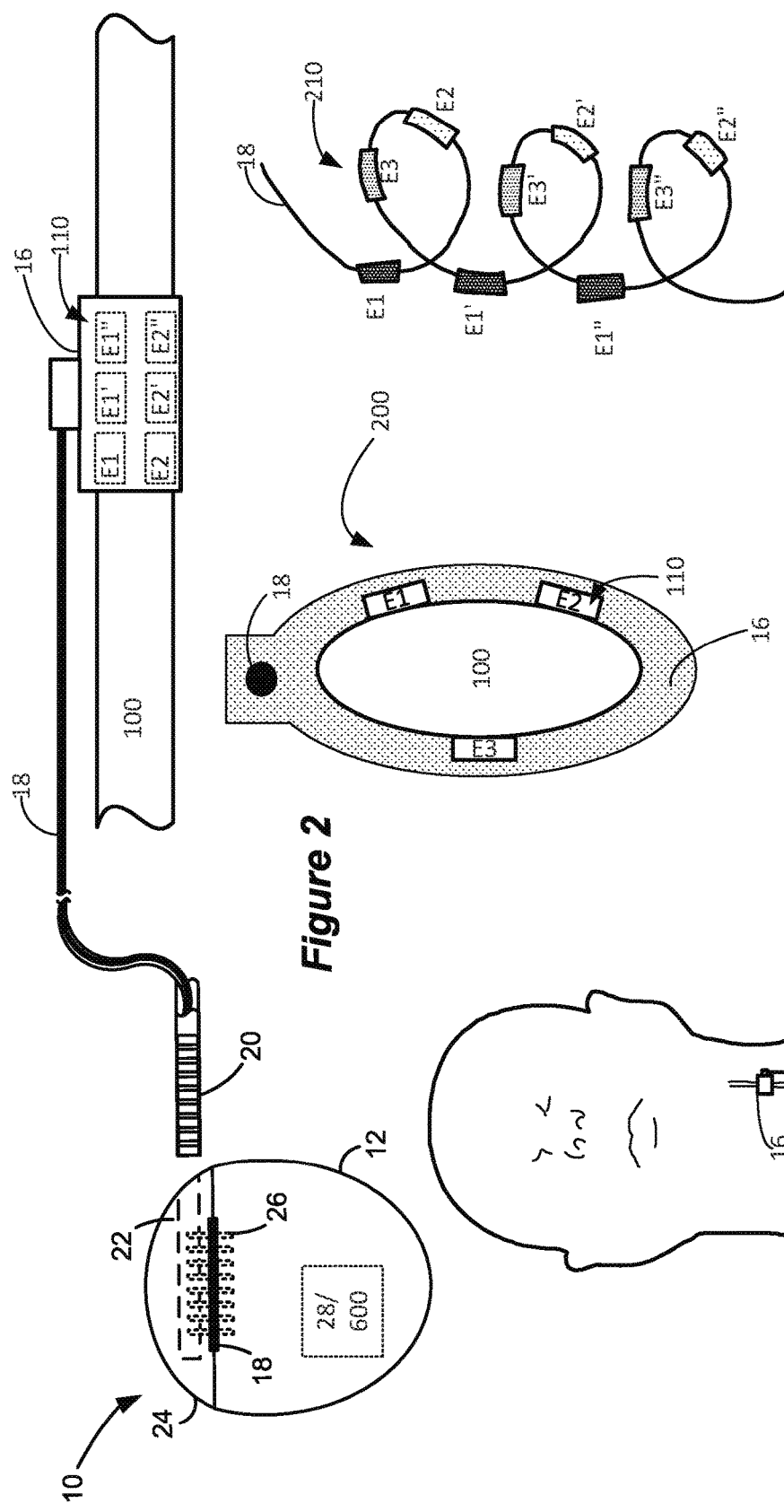
FIG. 2 shows aspects of an implantable medical device for stimulating a peripheral nerve.

FIG. 2 illustrates an implantable medical device system for providing peripheral nerve stimulation, such as vagus nerve stimulation (VNS). The device includes an Implantable Pulse Generator (IPG) 10, which includes a biocompatible device case 12 comprising titanium for example. The case 12 typically holds circuitry 28/600 (each of which are described in more detail bellow) and a battery (not shown), which battery may be either rechargeable or primary in nature. The IPG 10 is coupled to one or more electrode cuff leads 16 via one or more electrode lead wires 18 (one of which is shown). The electrode cuff leads are configured to engage the nerve 100. Each electrode cuff lead 16 may comprise one or more electrodes 110 that can be configured to provide electrical stimulation to the nerve 100 and/or sense electrical potentials at the neural tissue. The engagement of the electrodes 110 with the nerve 100 is illustrated in the cross-sectional view 200. Notice that the electrodes E1, E2, and E3 each engage the nerve 100 at different circumferential positions around the nerve. Notice that the electrodes E1, E1', E1", etc., each engage the nerve 100 at different longitudinal locations on the nerve 100, but at the same circumferential position.

Other electrode/nerve engagement configurations can be used. For example, the electrodes may be configured on a helical portion 210 of a helical electrode lead 18, which can be configured to wrap the nerve to secure contact of the electrodes to the nerve tissue. The helical portion 210 illustrated in FIG. 2 comprises electrodes E1, E2, and E3, which each engage the nerve at different circumferential positions, while E1, E1', E1", etc., each engage the nerve at different longitudinal positions.

The proximal ends of the lead 18 include electrode terminals 20 that are coupled to the IPG 10 at one or more connector blocks 22 fixed in a header 24, which can comprise an epoxy for example. Contacts in the connector blocks 22 contacts the electrode terminals 20, and communicate with the circuitry inside the case 12 via feedthrough pins 26 passing through a hermetic feedthrough 18 to allow such circuitry to provide stimulation to or monitor the various electrodes 110.

Figure 3:
FIG. 3 shows a patient having an implantable medical device for stimulating a peripheral nerve.

FIG. 3 illustrates a patient implantated for VNS. The IPG 10 is typically surgically implanted in the patient's pectoral region. The lead 18 is surgically routed to the cuff 16, which is configured to contact the vagus nerve 100.

Once a patient has been implanted with an implantable medical device, as illustrated in FIG. 3, the patient will typically undergo a "fitting" procedure to customize the parameters of the stimulation provided by the IPG 10 to obtain the greatest benefit for the patient. The IPG 10 can, for example, be programmed with multiple stimulation programs that can each include multiple stimulation routines. Each stimulation routine specifies parameters such as pulse width, stimulation amplitude, frequency, and the electrode(s) that serve as anodes and cathodes.

Figure 4:
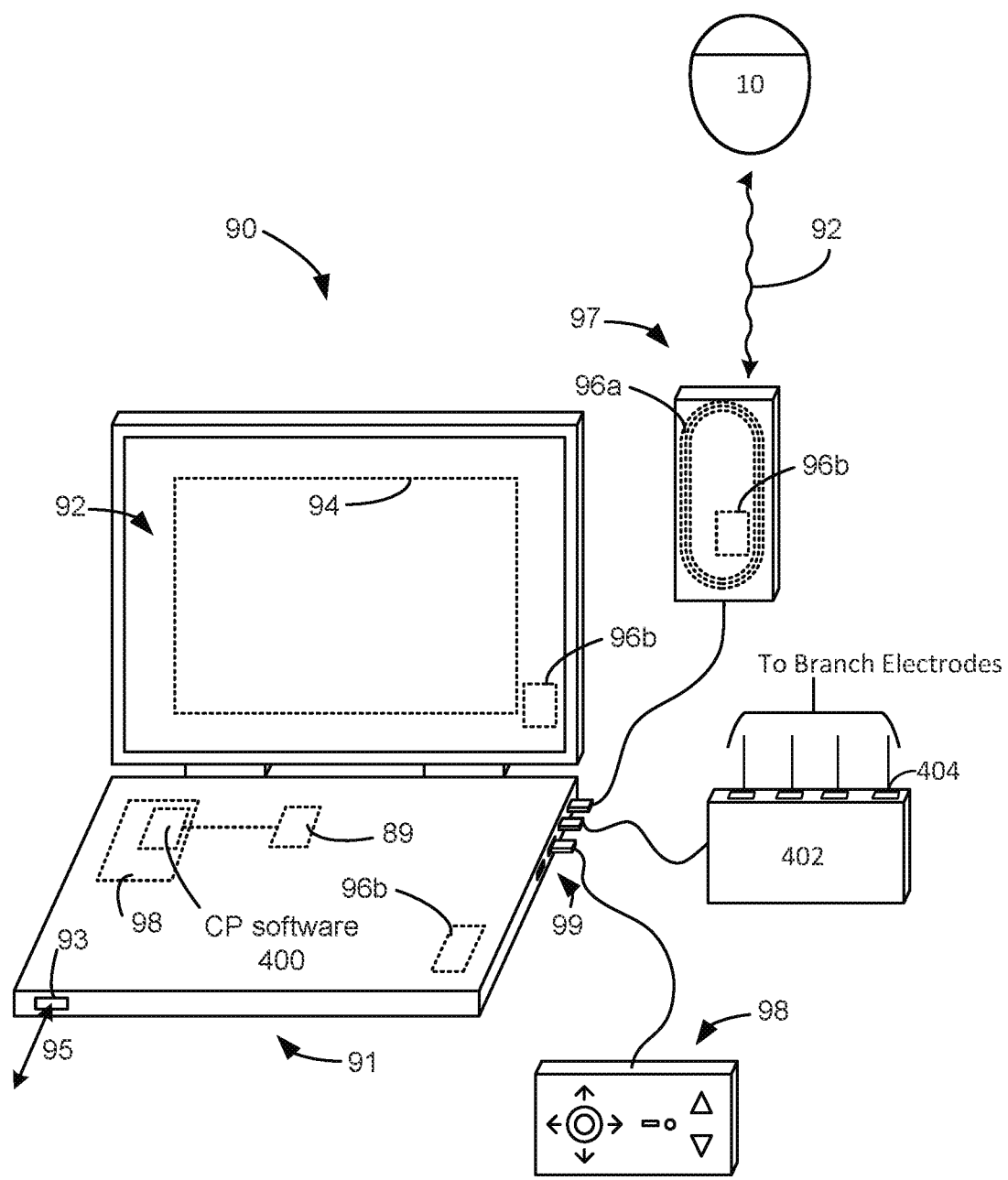
FIG. 4 shows aspects of an external system for communicating with an implantable medical device.

Referring to FIG. 4, the fitting process can be performed by communicating stimulation programs via a wireless link from a clinician programmer (CP) 90, which includes features (described below) that enable a clinician to home in on the appropriate stimulation therapy settings. As shown, CP system 90 can comprise a computing device 91, such as a desktop, laptop, or notebook computer, a tablet, a mobile smart phone, a Personal Data Assistant (PDA)-type mobile computing device, etc. (hereinafter "CP computer"). In FIG. 4, CP computer 91 is shown as a laptop computer that includes typical computer user interface such as a screen 92, a mouse, a keyboard, speakers, a stylus, a printer, etc., not all of which are shown for convenience.

Also shown in FIG. 4 are accessory devices for the CP system 90 that are usually specific to its operation as an IPG controller, such as a communication head 97, and a joystick 98, which are coupleable to suitable ports on the CP computer 91, such as USB ports 99, for example.

Communication between the CP system 90 and the IPG 10 occurs transcutaneously and may comprise magnetic inductive or short-range RF telemetry schemes as known in the art. For example, the communication head 97 can include a coil antenna 96a, a short-range RF antenna 96b, or both. The CP computer 91 may also communicate directly with the IPG 10, for example using an integral short-range RF antenna 96b.

If the CP system 90 includes a short-range RF antenna (either in CP computer 91 or communication head 97), such antenna can also be used to establish communication between the CP system 90 and other devices, and ultimately to larger communication networks such as the Internet. The CP system 90 can typically also communicate with such other networks via a wired link 95 provided at a Ethernet or network port 93 on the CP computer 91, or with other devices or networks using other wired connections (e.g., at USB ports 99).

Joystick 98 is generally used as an input device to select various stimulation parameters (and thus may be redundant of other input devices to the CP computer 91), but is also particularly useful in steering currents between electrodes to arrive at an optimal stimulation program, as discussed further below.

To program stimulation parameters, the clinician interfaces with a clinician programmer graphical user interface (CP GUI) 94 provided on the display 92 of the CP computer 91. As one skilled in the art understands, the CP GUI 94 can be rendered by execution of CP software 400 on the CP computer 91, which software may be stored in the CP computer's non-volatile memory 98. Such non-volatile memory 98 may include one or more non-transitory computer-readable storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), Electrically Erasable Programmable Read-Only Memory (EEPROM), and USB or thumb drive. One skilled in the art will additionally recognize that execution of the CP software 400 in the CP computer 91 can be facilitated by control circuitry 89 such as a microprocessor, microcomputer, an FPGA, other digital logic structures, etc., which is capable of executing programs in a computing device. Such control circuitry 89 when executing the CP software 400 will in addition to rendering the CP GUI 94 enable communications with the IPG 10 through a suitable antenna 96a or 96b, either in the communication head 97 or the CP computer 91 as explained earlier, so that the clinician can use the CP GUI 94 to communicate the stimulation parameters to the IPG 10.

The CP computer 91 may also be configured to interface with a branch electrode interface 402 which provides connections 404 for one or more branch electrodes. As discussed in more detail below, branch electrodes may be configured to deliver stimulation to and/or sense electrical signals in branches of a nerve, such as the vagus nerve. The branch electrodes may be percutaneous electrodes, implanted electrodes, or electroneurography (ENG)/electromyography EMG electrodes, for example. The branch electrode interface 402 may include circuitry, such as DAC/

ADC circuitry, multiplexing circuitry, and the like, for allowing the CP computer 91 to communicate with and control the branch electrodes.

Figure 5:
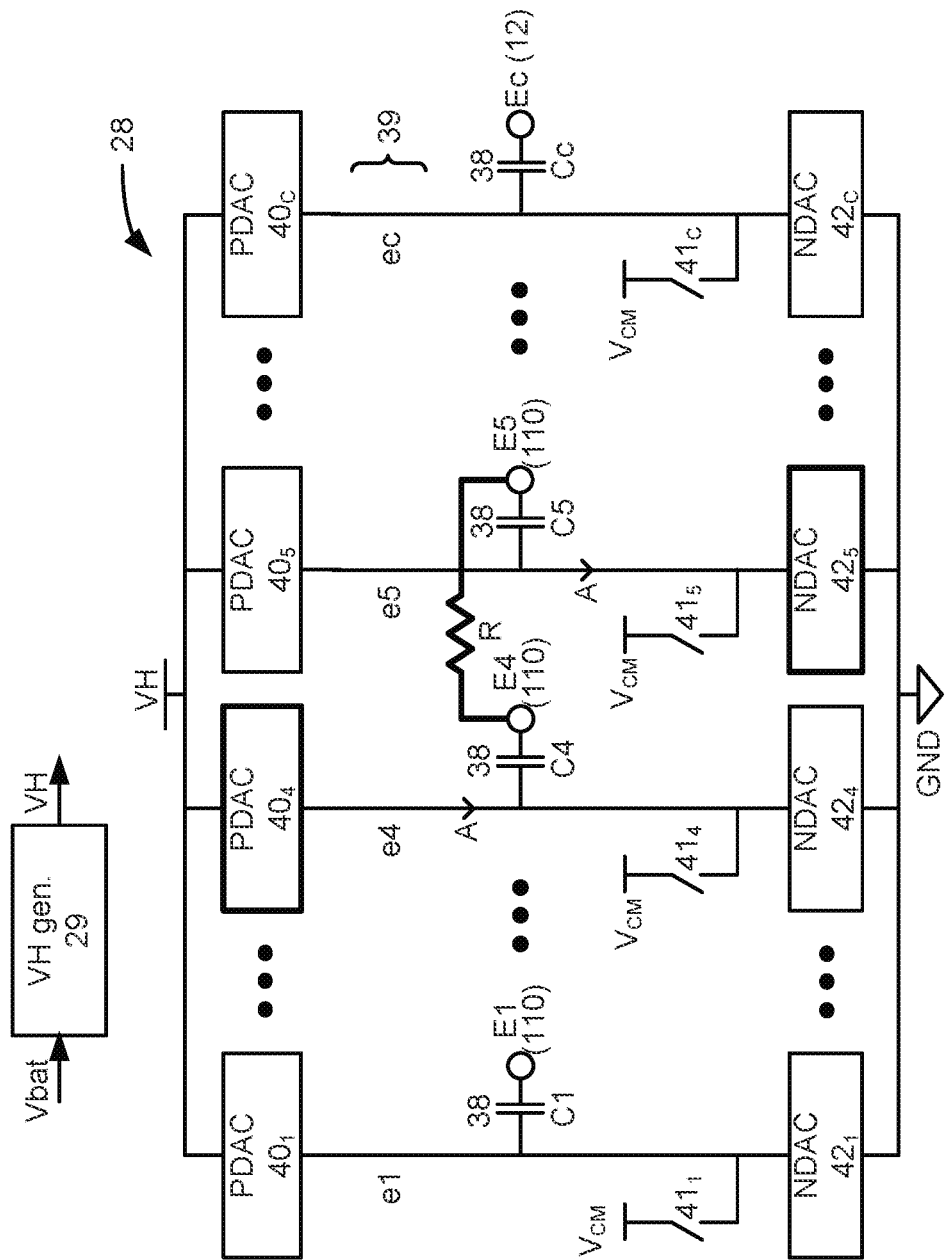
FIG. 5 shows aspects of stimulation circuitry for an implantable medical device.

As mentioned, the case 12 (FIG. 2) of the IPG 10 contains circuitry for operating the IPG (i.e., for powering the electrodes 110 for providing stimulation and sensing electrical potentials at the neural tissue). FIG. 5 shows an example of stimulation circuitry 28, which includes one or more current source circuits 40, and one or more current sink circuits $41_i$. The sources and sinks $40_i$ and $42_i$ can comprise Digital-to-Analog converters (DACs), and may be referred to as PDACs $40_i$ and NDACs $42_i$ in accordance with the Positive (sourced, anodic) and Negative (sunk, cathodic) currents they respectively issue. In the example shown, a NDAC/PDAC $40_i/42_i$ pair is dedicated (hardwired) to a particular electrode node ei 39. Each electrode node ei 39 is connected to an electrode Ei 110 via a DC-blocking capacitor Ci 38, for the reasons explained below. The stimulation circuitry 28 in this example also supports selection of the conductive case 12 as an electrode (Ec 12), which case electrode is typically selected for monopolar stimulation. PDACs $40_i$ and NDACs $42_i$ can also comprise voltage sources. Proper control of the PDACs $40_i$ and NDACs $42_i$ allows any of the electrodes 110 to act as anodes or cathodes to create a current through a patient's tissue, R, hopefully with good therapeutic effect.

Power for the stimulation circuitry 28 is provided by a compliance voltage VH. As described in further detail in U.S. Patent Application Publication 2013/0289665, the compliance voltage VH can be produced by a compliance voltage generator 29, which can comprise a circuit used to boost the battery voltage (Vbat) to a voltage VH sufficient to drive the prescribed current A through the tissue R. The compliance voltage generator 29 may comprise an inductor-based boost converter as described in the '665 Publication, or can comprise a capacitor-based charge pump. Because the resistance of the tissue is variable, VH may also be variable, and can be as high as 18 Volts in one example.

Other stimulation circuitries 28 can also be used in the IPG 10. In an example not shown, a switching matrix can intervene between the one or more PDACs $40_i$ and the electrode nodes ei 39, and between the one or more NDACs $42_i$ and the electrode nodes. Switching matrices allows one or more of the PDACs or one or more of the NDACs to be connected to one or more anode or cathode electrode nodes at a given time. Various examples of stimulation circuitries can be found in U.S. Pat. Nos. 6,181,969, 8,606,362, 8,620,436, 10,912,942, and U.S. Patent Application Publication 2018/0071520. Much of the stimulation circuitry 28 of FIG. 4, including the PDACs $40_i$ and NDACs $41_i$, the switch matrices (if present), and the electrode nodes ei 39 can be integrated on one or more Application Specific Integrated Circuits (ASICs), as described in U.S. Patent Application Publications 2012/0095529, 2012/0092031, and 2012/0095519, which are incorporated by reference. As explained in these references, ASIC(s) may also contain other circuitry useful in the IPG 10, such as telemetry circuitry (for interfacing off chip with telemetry antennas), the compliance voltage generator 29, various measurement circuits, etc.

Also shown in FIG. 5 are DC-blocking capacitors Ci 38 placed in series in the electrode current paths between each of the electrode nodes ei 39 and the electrodes Ei 110 (including the case electrode Ec 12). The DC-blocking capacitors 38 act as a safety measure to prevent DC current injection into the patient, as could occur for example if there is a circuit fault in the stimulation circuitry 28. The DC-blocking capacitors 38 are typically provided off-chip (off of the ASIC(s)), and instead may be provided in or on a circuit board in the IPG 10 used to integrate its various components, as explained in U.S. Patent Application Publication 2015/0157861.

FIG. 5 shows that stimulation circuitry 28 can include passive recovery switches $41_i$, which are described further in U.S. Patent Application Publications 2018/0071527 and 2018/0140831. Passive recovery switches $41_i$ may be attached to each of the electrode nodes 39, and are used to passively recover any charge remaining on the DC-blocking capacitors Ci 38 after issuance of stimulation.

Figure 6A:
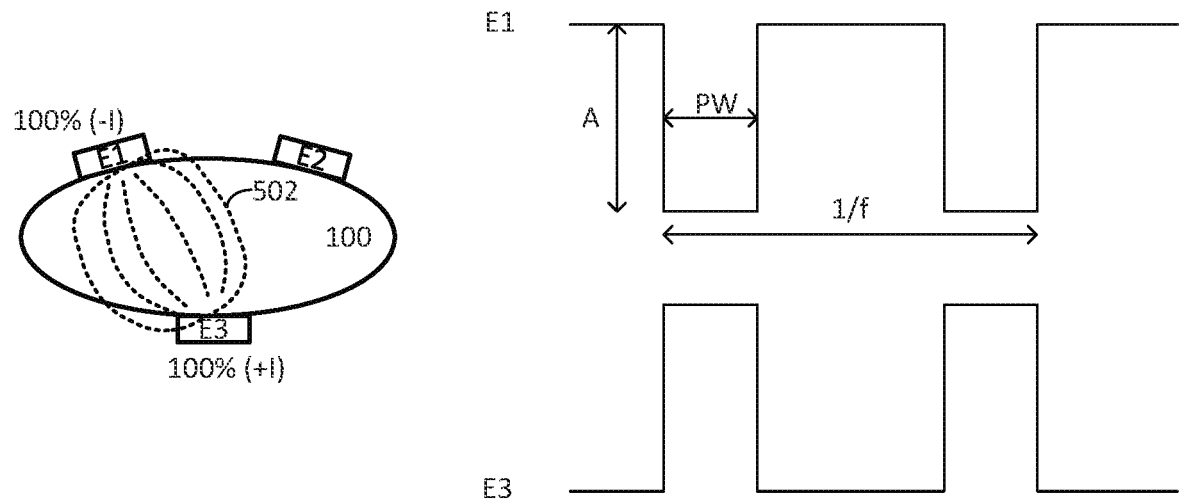
FIGS. 6A-6D show stimulation of a peripheral nerve using circumferentially located electrodes.
Figure 6B:
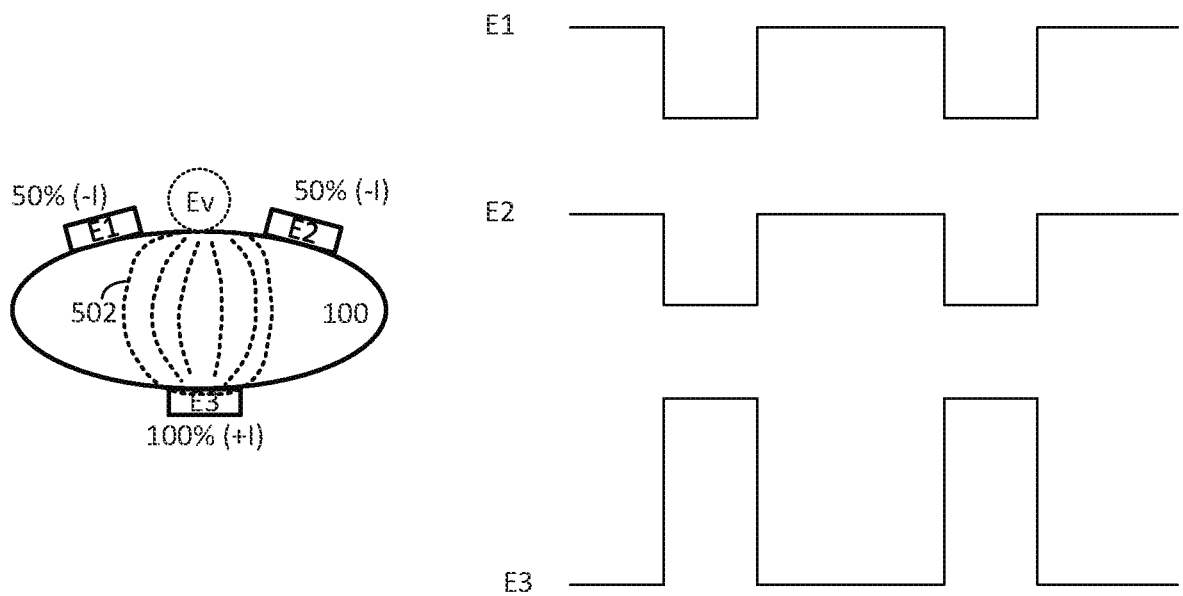
Figure 6C:
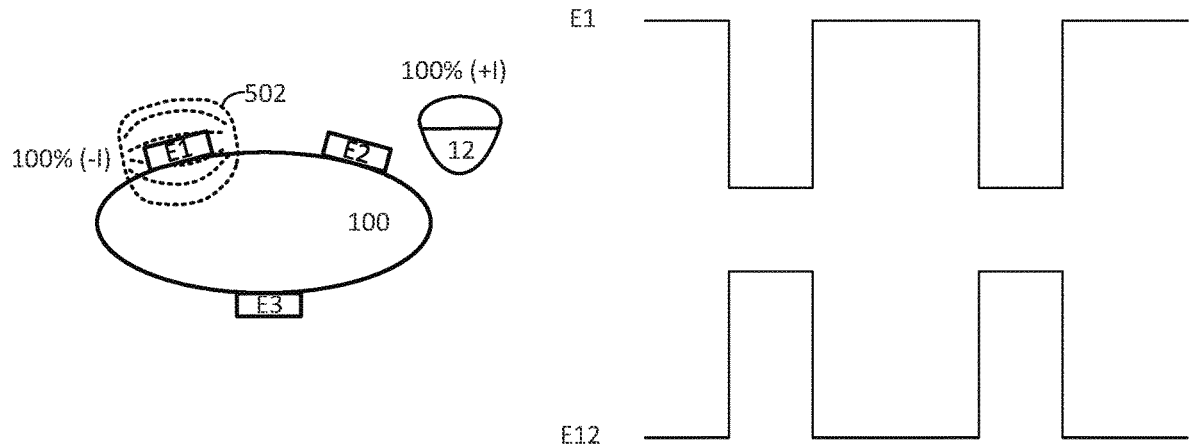
Figure 6D:
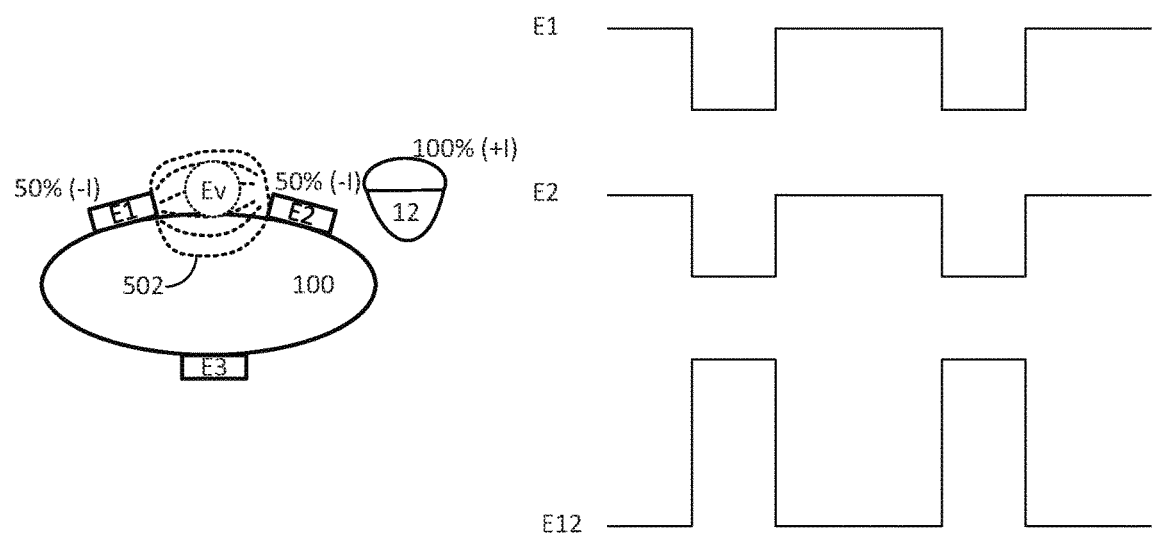

The circuitry 28 allows current to/from any of the electrodes 110 (and case 12) to be independently controlled. The independent control of current to the electrodes can be used to fractionize and steer the current provided to the electrodes to shape the electric field provided to the neural tissue. In other words, two or more electrodes can be chosen to act as anodes or cathodes at a given time, allowing the electric field in the tissue to be shaped. FIGS. 6A-6D illustrate a cross-section of a nerve, such as the vagus nerve 100 having three electrodes E1, E2, and E3 configured about its circumference. For example, the electrodes E1-E3 may be configured within an electrode cuff lead 16 or helical portion 210 of an electrode lead (FIG. 2). The cuff/helical portion is omitted in the illustrations that follow, for clarity. FIG. 6A illustrates bipolar stimulation in which the electrode E1 sinks 100% of the cathodic current and the electrode E3 sources 100% of the anodic current. The stimulation may be provided as pulses, as shown, having an amplitude A, a pulse width PW, and frequency f Other stimulation waveforms may be used, as is known in the art. The stimulation illustrated in FIG. 6A is "balanced" in that the cathodic and anodic currents provided at the nerve 100 are equal. Note that in other embodiments, for example, in embodiments involving anode intensification (discussed below), the stimulation may be unbalanced. An electric field 502 resulting from the stimulation is schematically illustrated in FIG. 6A. FIG. 6B illustrates bipolar stimulation in which the cathodic current is split such that E1 and E2 each receive 50% of the current. The splitting of the cathodic current can be thought of as generating a "virtual electrode" Ev positioned between E1 and E2 which acts as a virtual cathode. The physical electrode E3 acts as the anode. Again, a resulting electric field 502 is illustrated, which encompasses different portions of the nerve than the field illustrated in FIG. 6A. FIG. 6C illustrates a monopolar stimulation configuration in which E1 is selected as the cathode and receives 100% of the cathodic current and the case 12 of the IPG serves as a remote anode and handles 100% of the anodic current. FIG. 6D illustrates a monopolar stimulation configuration wherein cathodic current is split between the physical electrodes E1 and E2 to provide a virtual electrode Ev that acts as a cathode. The case 12 of the IPG acts as a remote anode.

Figure 7:
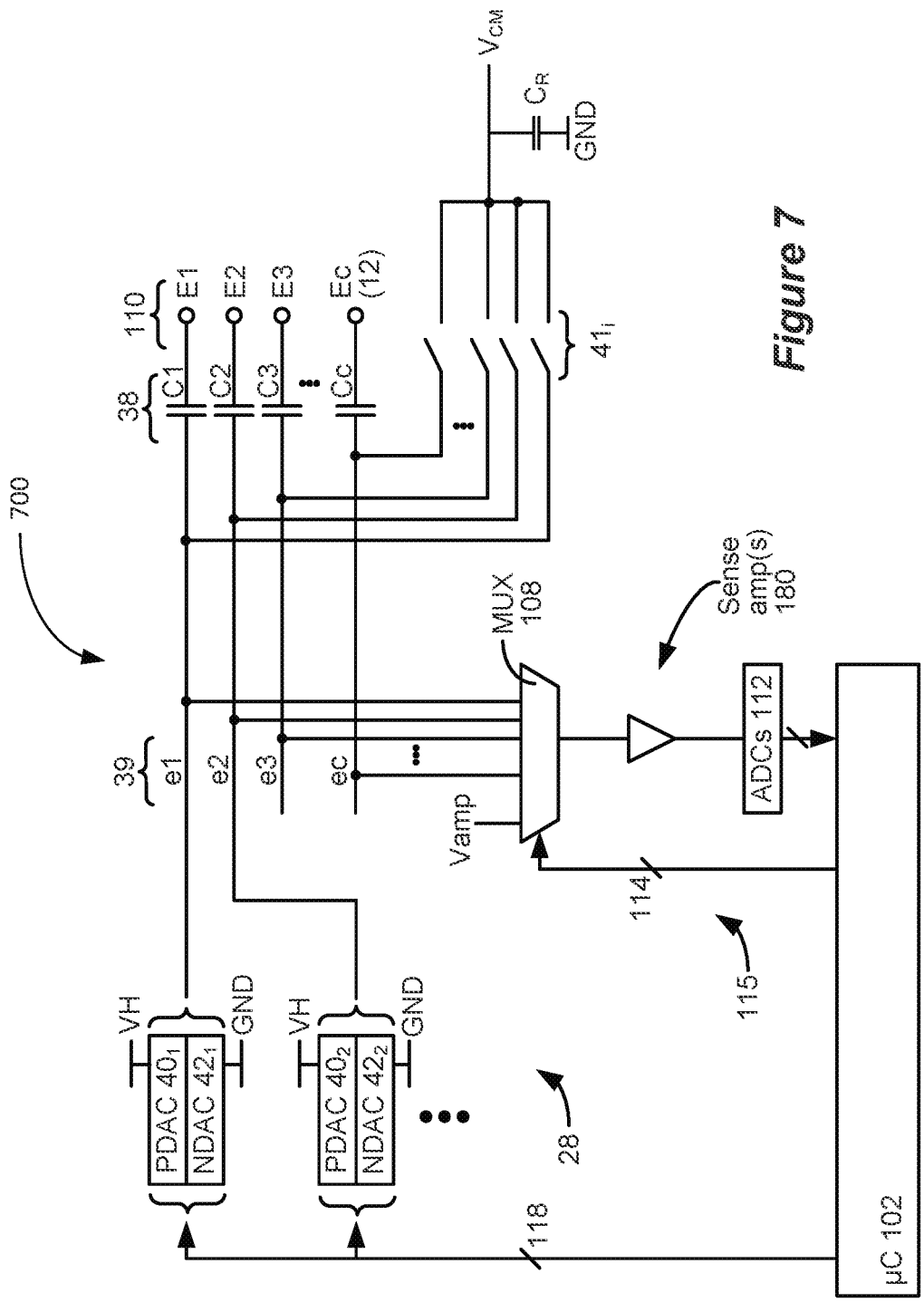
FIG. 7 shows aspects of sensing circuitry for an implantable medical device.

As mentioned above, the electrodes 110 can also be configured for sensing electrical potentials, such as compound action potentials (CAPs), present in the neural tissue. FIG. 7 shows circuitry 700 for an IPG 10 that is capable of providing stimulation and sensing action potentials other neural responses or signals. The IPG 10 includes control circuitry 102, which may comprise a microcontroller for example such as Part Number MSP430, manufactured by Texas Instruments, which is described in data sheets at http://www.ti.com/lsds/ti/microcontroller/16-bit_msp430/overview.page? DCMP=MCU_other& HQS=msp430, which is incorporated herein by reference. Other types of controller circuitry may be used in lieu of a microcontroller as well, such as microprocessors, FPGAs, DSPs, or combinations of these, etc. Control circuitry 102 may also be formed in whole or in part in one or more Application Specific Integrated Circuits (ASICs), such as those described earlier.

The circuitry 700 also includes stimulation circuitry 28 to produce stimulation at the electrodes 110, which may comprise the stimulation circuitry 28 shown earlier (FIG. 5). A bus 118 provides digital control signals from the control circuitry 102 to one or more PDACs $40_i$ or NDACs $42_i$ to produce currents or voltages of prescribed amplitudes (A) for the stimulation pulses, and with the correct timing (pulse width PW, frequency f). As noted earlier, the DACs can be powered between a compliance voltage VH and ground. As also noted earlier, switch matrices could intervene between the PDACs and the electrode nodes 39, and between the NDACs and the electrode nodes, to route their outputs to one or more of the electrodes, including the conductive case electrode 12 (Ec). Control signals for switch matrices, if present, may also be carried by bus 118. Notice that the current paths to the electrodes 110 include the DC-blocking capacitors 38 and the passive charge recovery switching circuits $41_i$ described earlier. A capacitor CR may be provided between $W_{CM}$ and ground (GND) to lower the recovery impedance.

The circuitry 700 also includes sensing circuitry 115, and one or more of the electrodes 110 can be used to sense neural responses such as compound action potentials. In this regard, each electrode node 39 is further coupleable to a sense amp circuit 180. Under control by bus 114, a multiplexer 108 can select one or more electrodes to operate as sensing electrodes by coupling the electrode(s) to the sense amps circuit 180 at a given time. Although only one multiplexer 108 and sense amp circuit 180 is shown in FIG. 7, there could be more than one. For example, there can be four multiplexer 108/sense amp circuit 180 pairs each operable within one of four timing channels supported by the IPG 10 to provide stimulation. The analog waveform comprising the sensed electric potential is preferably converted to digital signals by one or more Analog-to-Digital converters (ADC(s)) 112. The ADC(s) 112 may also reside within the control circuitry 102, particularly if the control circuitry 102 has A/D inputs. Multiplexer 108 can also provide a DC reference voltage, Vamp (e.g., GND), to the sense amp circuit 180, as is useful in a single-ended sensing mode.

The methods and systems described herein use the capabilities described above for independently controlling the current to the electrodes that circumferentially contact the nerve to shape the electric field within the neural tissue. By adjusting the field shape, different neural populations within the nerve can be preferentially stimulated. Thus, it is possible to preferentially stimulate neural populations that evoke a therapeutic effect and to avoid stimulating neural populations that evoke side effects. The disclosed methods and systems also involve mapping and calibrating the relationship of stimulation configurations (i.e., which electrodes are active and/or stimulation parameters such as amplitude, frequency, and pulse width) and the relevant nerve anatomy.

Figure 1:
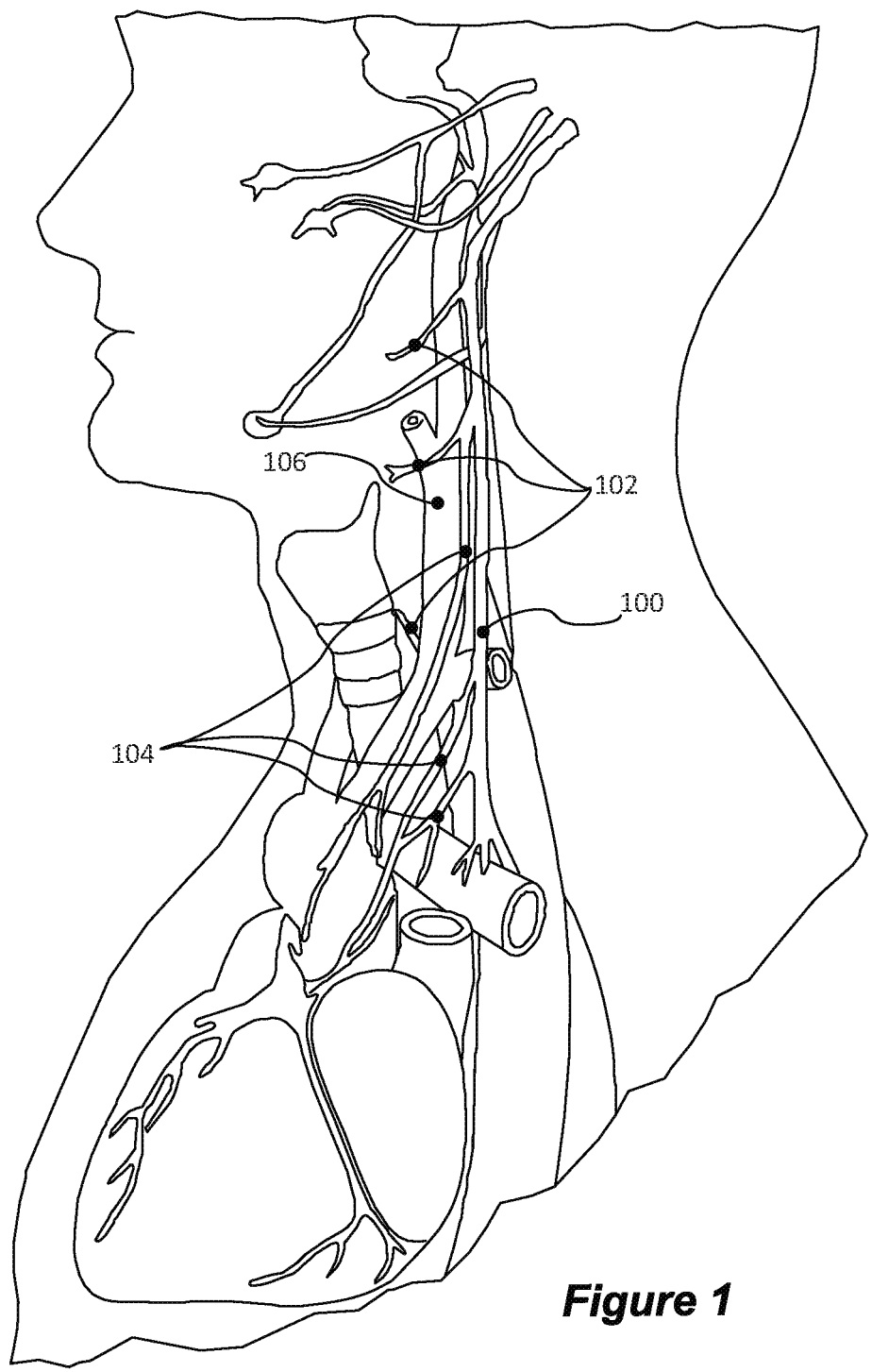
FIG. 1 shows anatomy of the vagus nerve.
Figures 8, 9:
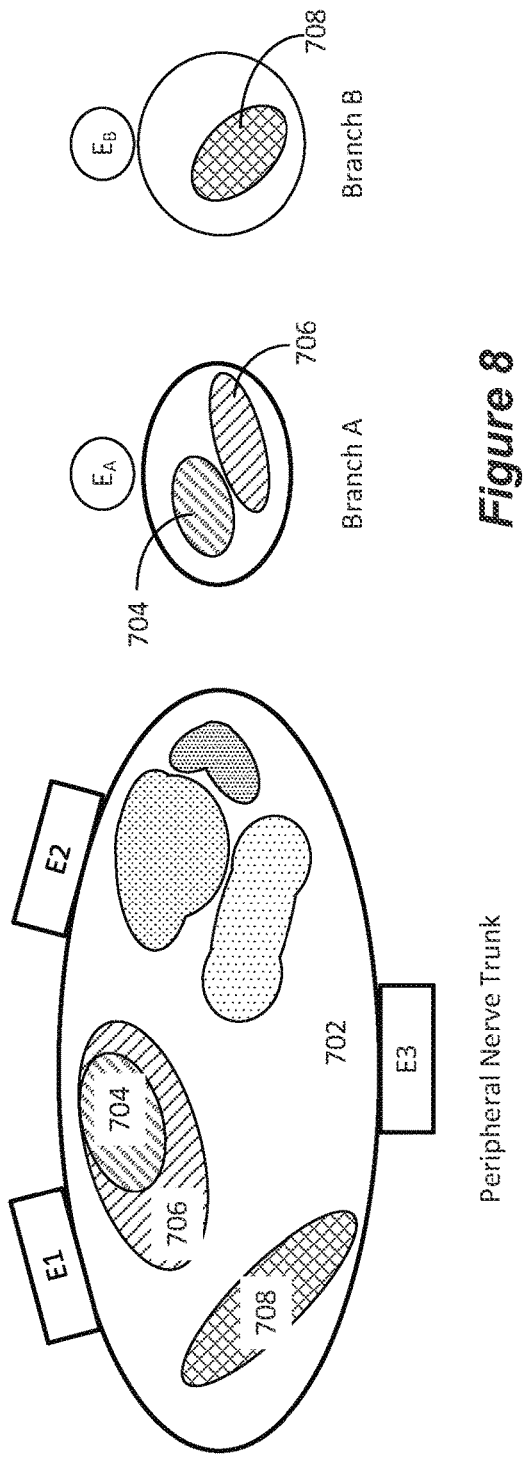
FIG. 8 illustrates a cross section of a peripheral nerve at the trunk level and cross sections of two branches and shows commonality of neural elements in each.
FIG. 9 illustrates a mapping of coupling between stimulation at a peripheral nerve trunk and peripheral nerve branches.

FIG. 8 illustrates a cross section of a nerve at the trunk level 702. The trunk 702 may be the trunk level of the vagus nerve 100 (FIG. 1), for example. As mentioned above, the vagus nerve comprises multiple fascicles. Fascicles 704, 706, and 708 are among the fascicles illustrated in FIG. 7. Electrodes E1, E2, and E3 are configured about the circumference of the nerve trunk 702. For example, the electrodes E1-E3 may be configured within an electrode cuff 16 (FIG. 2), which has been implanted on the vagus nerve.

FIG. 8 also illustrates cross sections of two branches of the nerve, referred to as Branch A and Branch B. Branch A comprises the fascicles 704 and 706 while Branch B comprises the fascicle 708. Assume that the clinician has determined that VNS therapy that stimulates Branch A but avoids stimulation of Branch B is desirable. For example, stimulation of Branch A may provide a therapeutic effect and stimulation of Branch B may be associated with a side effect. So, the goal is to determine how to stimulate at the trunk level 702 such that Branch A is stimulated but Branch B is not.

A mapping procedure may be used to solve this problem. The mapping procedure may be conducted as part of the fitting procedure described above. According to one embodiment, branch electrodes $E_A$ and $E_B$ may be configured near Branches A and B, respectively. According to some embodiments, one or more of the branch electrodes $E_A$ and $E_B$ may be percutaneous electrodes that are inserted through the skin and positioned near the Branches A and B. Alternatively, according to some embodiments, one or more of the branch electrodes $E_A$ and $E_B$ may be implanted electrodes. Still alternatively, if one or more of the Branches A or B are disposed near the patient's skin, then one or more of the branch electrodes $E_A$ and $E_B$ may be external electrodes, such as electroneurogram (ENG)/electromyogram (EMG) electrodes positioned on the patient's skin. The branch electrodes may be controlled by the CP computer 91 via the branch electrode controller 402 (FIG. 4). Alternatively, the branch electrodes may be controlled by a different external device, such as an EMG/ENG station, for example. With embodiments using implantable branch electrodes, the branch electrodes may be controlled by the IPG 10 or by another implantable medical device.

According to one embodiment of the mapping procedure, stimulation is applied at the branch electrodes. For example, referring to FIG. 8, stimulation may be applied at the electrode $E_A$ (positioned at Branch A). The stimulation at the branch electrode may evoke electrical signals, such as compound action potentials (CAPs) within the nerves of the branch. The electrical signals may travel through the branch and to the trunk level of the nerve where they may be recorded at one or more of the trunk electrodes E1, E2, and/or E3.

Notice that the Branch A contains vesicles 704 and 706. Thus, when Branch A is stimulated, electrical signals evoked in those vesicles will be sensed most strongly at the trunk electrode E1 (compared to E2 and E3) at the trunk level because the trunk electrode E1 is nearest to the position of those vesicles within the trunk. Likewise, if stimulation is applied at Branch B (which contains vesicle 708) using the electrode EB, the evoked electrical signals will be sensed most strongly at the trunk electrodes E3 and E1, which are nearest to the position of the vesicle 708.

Thus, by stimulating at one or more of the branch electrodes and comparing the amplitudes of the sensed electrical signals recorded at the circumferentially located trunk electrodes (E1, E2, E3), the neural elements contained within the branches can be mapped to corresponding locations within the trunk. This mapping is shown in the grid 900 illustrated in FIG. 9. The stimulating electrodes are indicated along the vertical edge of the grid and the recording electrodes are indicated along the horizontal edge of the grid. The grid contains coupling factors (expressed in arbitrary units) that indicate the degree to which the electrodes couple to each other through the neural anatomy. Notice that when $E_A$ is the stimulating branch electrode, the intensity of the recorded evoked electrical signal is greater at the trunk electrode E1 (coupling factor=5) compared to E2 (coupling factor=0) and E3 (coupling factor=1).

According to some embodiments, any of the electrodes (i.e., trunk electrodes E1, E2, and E3, as well as branch electrodes $E_A$ and $E_B$) can be used for stimulation or for recording. Thus, the mapping process may also involve stimulating at the trunk electrodes and sensing at the branch electrodes. For example, according to one embodiment a trunk electrode (e.g., E1) is selected for stimulation and the branch electrodes (e.g., $E_A$ and $E_B$) are configured for sensing. Stimulation can be applied at a low amplitude to the trunk electrode and the amplitude can be incrementally increased until an electrical signal is detected at one of the branch electrodes. The process can then be repeated sequentially using the other trunk electrodes. By comparing the amplitudes at which the stimulation at the different trunk electrodes evoke signals at the branch electrodes, the neural elements contained within the branches can be mapped to corresponding locations within the trunk. Again, referring to the grid 900, a coupling factor can be used to indicate the degree of coupling between each of the circumferentially disposed trunk electrodes and each of the branch electrodes. The coupling factors can be used to triangulate the locations within the trunk of neural elements relating to the branches.

The discussion of FIGS. 8 and 9 above is concerned with electrical signals evoked by the stimulation electrodes and that travel directly to the recording electrodes through the intervening neural tissue. In other words, such sensed signals indicate a direct, or first order, coupling between the excited and the sensed neural elements. Those electrical signals travel at a speed of about 50-60 ms$^{-1}$ and thus will typically be sensed with a latency of about 0.5 to a few milliseconds. Another type of signal that may be recorded at a recording electrode is referred to as a rebound signal. Referring again to FIGS. 8 and 9, assume that a trunk electrode (e.g., E3) issues a stimulation pulse that evokes an electrical signal (e.g., action potential) in one or more fascicles within the trunk. Some of the evoked electrical signals may travel through the fascicle(s) to the brain and undergo some processing in the brain. The brain may issue efferent signals in response and those response signals may travel from the brain toward the body via the same or different fascicles. Those efferent response signals may be sensed at one or more of the trunk electrodes. Those sensed signals are referred to herein as rebound signals, meaning that they indicate an indirect, or second order, coupling between the excited and the sensed neural tissue. The rebound signal(s) will typically have a longer latency (e.g., 10s of milliseconds) than the first order coupling signals. Notice that in grid 900 (FIG. 9), stimulation at E3 gives rise to rebound sensed signals at E2 and E3. Thus, using rebound signals, the mapping procedures described herein can be used to map second order coupling between neural elements in the trunk and/or in the branches.

Figure 10:
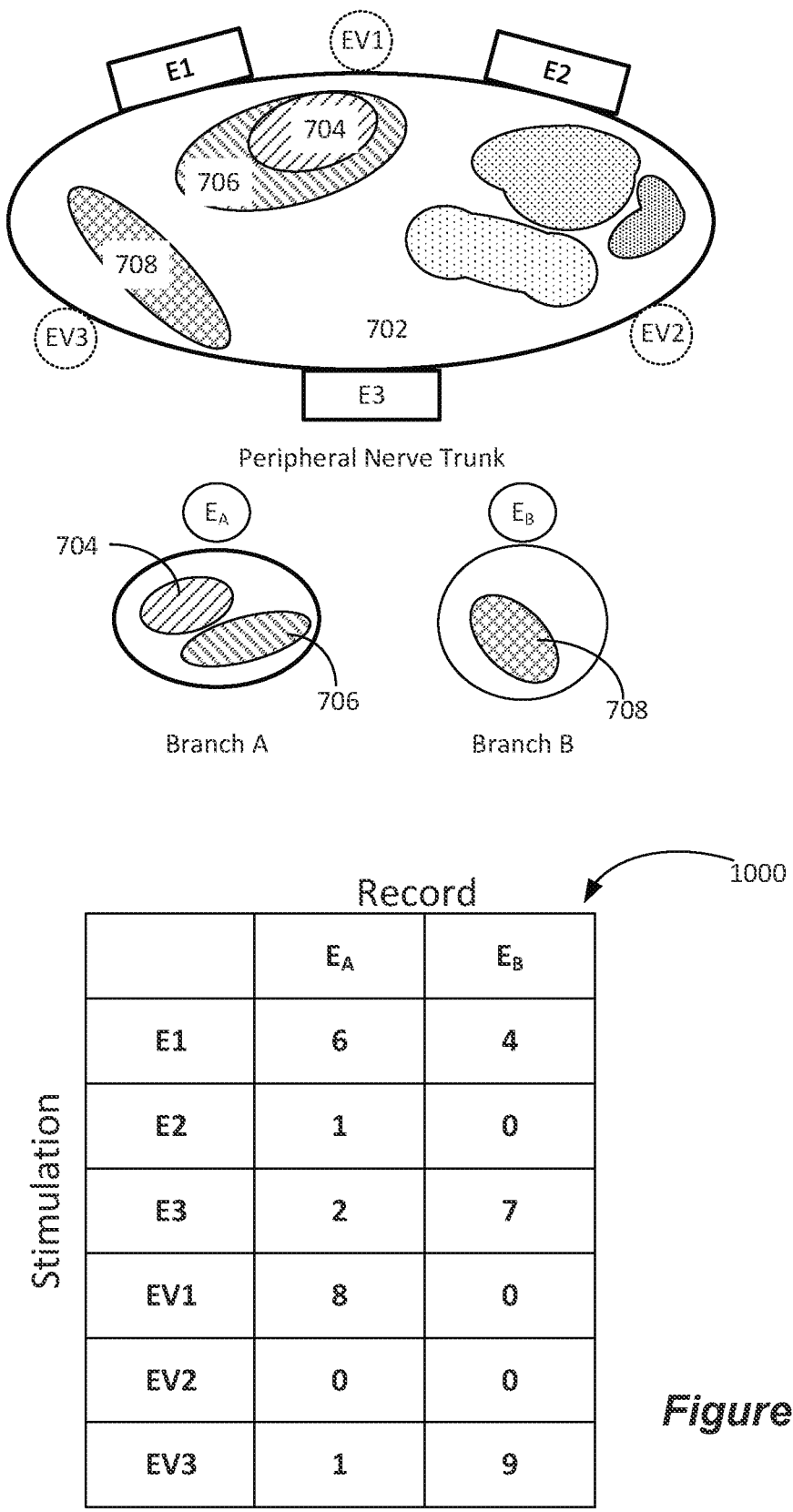
FIG. 10 shows mapping of neural elements in a nerve trunk with neural elements in branches using virtual electrode positions.

Notice that the only trunk positions reflected in the grid 900 are the positions that correspond to the positions of the trunk electrodes E1, E2, and E3. However, it should be appreciated that fractionization of the stimulation current among the trunk electrodes E1, E2 and E3 using independent current control, as described above, can be used to also stimulate the trunk at virtual electrode positions on the circumference of the nerve trunk. The coupling of the branch electrodes with stimulation at virtual electrode positions can also be interrogated, thereby generating more precise maps of the trunk anatomy. FIG. 10 illustrates an embodiment wherein fractionalization and current steering among the trunk electrodes E1, E2, and E3 (as described above with reference to FIGS. 6A-6D) are used to generate virtual electrodes EV1, EV2, and EV3. It should be appreciated that any number of virtual electrodes may be generated even though only three are shown in FIG. 10. FIG. 10 also shows a mapping grid 1000 wherein the positions of the physical trunk electrodes and the virtual trunk electrodes are mapped to the branches A and B based on their respective coupling factors.

The mapping procedures discussed with reference to FIGS. 8-10 are directed to determining correlations between stimulation positions on the nerve trunk to the branching anatomy of the nerve. Similar mapping procedures can be used to determine how stimulation parameters other than simply the circumferential stimulation position effect activation of the neural elements within the branches. For example, according to some embodiments, positions on the trunk can be stimulated using various values of stimulation parameters such as amplitude, frequency, pulse width, etc. Recording branch electrodes configured at one or more of the branches can be used to sense evoked electrical signals at the branches. Relationships, such as coupling factors, can be determined at the branches as a function of the stimulation parameter values used at the trunk level. For example, it may be determined that higher frequency stimulation at the trunk is more results in greater coupling with one of the branches, resulting in a greater coupling factor.

Similar maps can be created to differentiate nerve fiber sizes within the nerve using a technique referred to as anode intensification. Anode intensification is described in U.S. Patent Publication No. 2010/0331926, the contents of which are incorporated herein by reference. With typical cathodic monopolar stimulation or balanced bipolar stimulation, such as illustrated in FIGS. 6A-6D, larger nerve fibers are recruited at lower stimulation amplitudes than are smaller nerve fibers. Anode intensification can be used to reverse that recruitment order.

Anode intensification is achieved by sourcing the electrical current from at least one anode (and more typically two "guarding" anodes) into a target neural tissue region, sinking a portion of the electrical current from the target neural tissue region into at least one local cathode adjacent the target neural tissue region, and sinking another portion of the electrical current from the target neural tissue region into at least one cathode remote from the target neural tissue region. the remote cathode may be the case electrode, for example.

Figure 11:
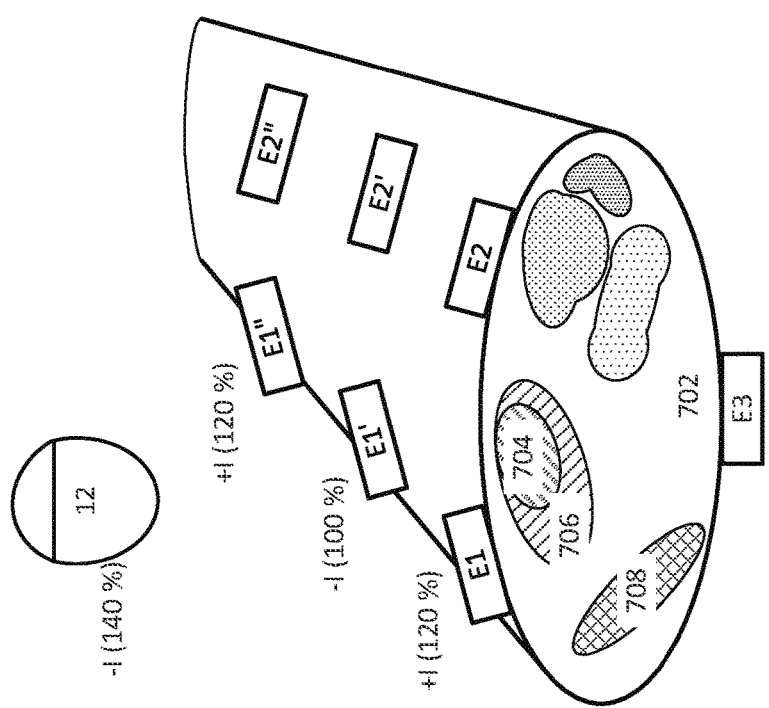
FIG. 11 shows an example of an electrode configuration for anode intensification at a peripheral nerve.

FIG. 11 illustrates an embodiment of an electrode configuration for providing anode intensification at a nerve trunk 702. To provide anode intensification it is desirable to have at least three electrodes arranged parallel to the orientation of the axons to be excited. Notice that the illustrate configuration provides electrodes at different longitudinal levels (e.g., E1, E1', E1") of the nerve trunk. Those electrodes are parallel to the axon orientation. According to some embodiments, a greater number of longitudinal electrodes may be used, which allows greater flexibility with respect to the anode/cathode distance. The configuration also provides sets of electrodes at different circumferential positions (e.g., E1, E2, E3) about the nerve trunk. According to some embodiments, a greater number of circumferential electrodes (e.g., four circumferential electrodes) may be used.

In the illustrated configuration the electrode E1' serves as a local cathode and the electrodes E1 and E1" serve as local "guarding" anodes. As illustrated, each of the local anodes provides 120% the amount of current sunk by the local cathode E1'. The remainder of the provided current is sunk at the remote case electrode 12. As explained in more detail in the incorporated '926 Publication, the anode intensification ratio for the illustrated configuration is (120+120)/100, i.e., 2.4. By varying the anode intensification ratio, fiber size selectivity can be varied. Large fibers are preferentially activated at low anode intensification ratios and smaller fibers are preferentially activated at higher anode intensification ratios.

Figure 12:
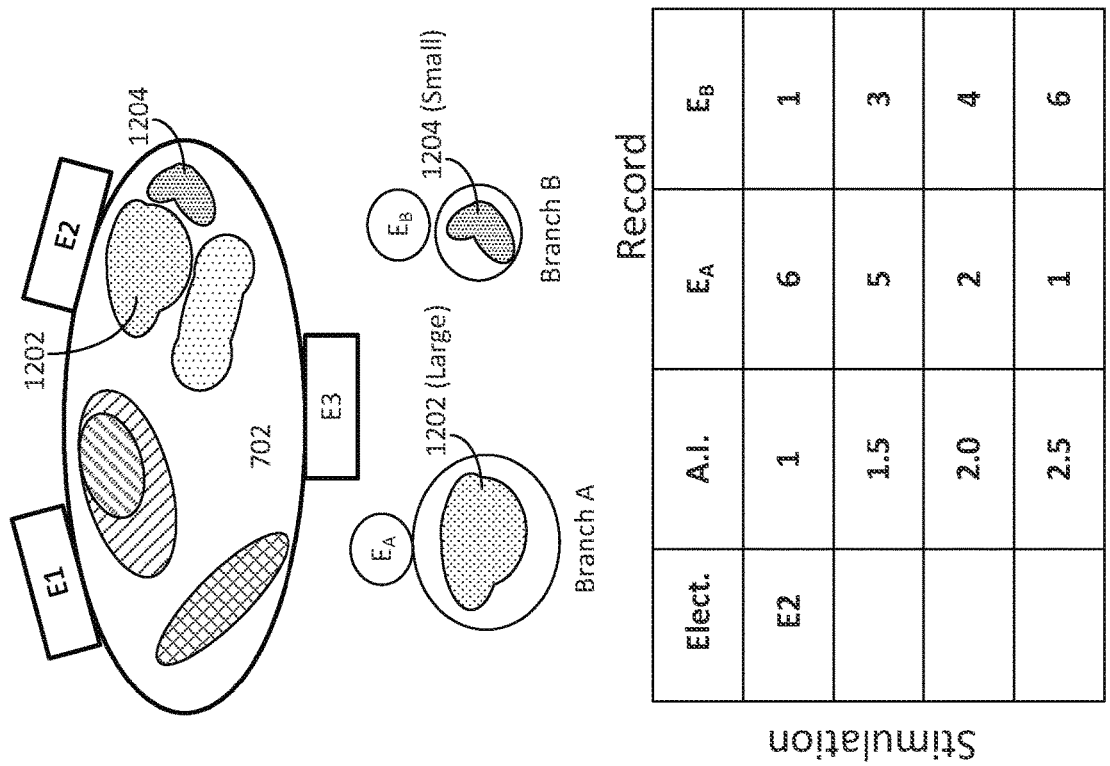
FIG. 12 illustrates mapping of neural elements in a nerve trunk with neural elements in branches using anode intensification.

FIG. 12 illustrates an example of using anode intensification and the mapping procedures described above to determine correlations between neural elements in a trunk 702 of a nerve with neural elements in branches of the nerve (namely, Branch A and Branch B). Notice that Branch A contains a fascicle 1202 and Branch B contains a fascicle 1204. Also notice that those two fascicles are very near to each other in the trunk 702. Thus, it would be difficult to preferentially stimulate and map one of the fascicles over the other using the current steering methods described above. However, anode intensification may be used to preferentially stimulate one of the fascicles over the other if the fascicles contain different sizes of nerve fibers. For example, assume that the fascicle 1202 contains primarily large nerve fibers and the fascicle 1204 contains primarily smaller nerve fibers. Stimulation without anode intensification would activate the nerve fibers in the fascicle 1202 at a lower amplitude than would be required to activate the nerve fibers in the fascicle 1204. Contrarily, anode intensification could be used to preferentially activate the nerve fibers in the fascicle 1204.

The mapping grid 1200 illustrates coupling factors using stimulation at the position of the electrode E2 at the trunk 702 to the branch electrodes $E_A$ and $E_B$ as a function of anode intensification ratio (A.I.). At an anode intensification ratio of 1 (no anode intensification), stimulation at E2 couples more strongly to the branch electrode $E_A$. However, as anode intensification is increased, the branch electrode $E_B$ coupling increases. This demonstrates how the mapping procedures described herein can be used to elucidate anatomical features of the neural anatomy, such as fiber size.

Thus far, the disclosure has described how peripheral nerve stimulation can be achieved with electrodes configured upon a peripheral at different circumferential positions about the nerve and at different longitudinal positions on the nerve. Aspects of the disclosure also relate to user interface (UI) systems and elements to facilitate visualization, mapping, and programming of such systems.

Figure 13:
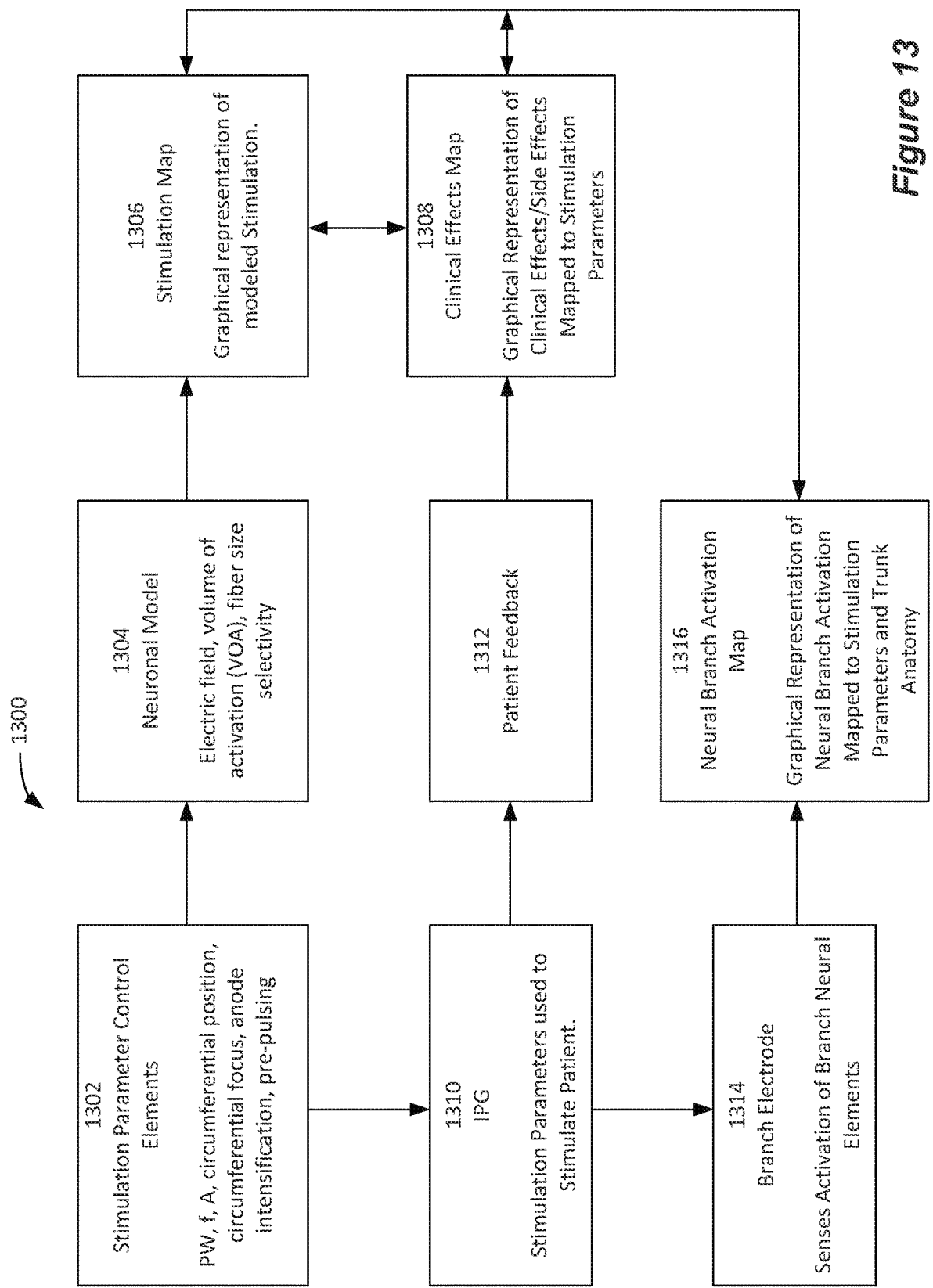
FIG. 13 illustrates some aspects of a programming system for mapping and programming peripheral nerve stimulation.

FIG. 13 illustrates some aspects of a programming system 1300 for mapping and programming peripheral nerve stimulation. The illustrated system provides stimulation parameter control elements 1302 for selecting stimulation parameters. For example, assume that stimulation is to be provided at a peripheral nerve using an electrode configuration that provides multiple circumferential electrodes and multiple longitudinal electrodes, as described above. The stimulation parameter control elements allow selection of stimulation pulse width (PW), frequency (f), amplitude (A), circumferential position, circumferential focus, anode intensification, pre-pulsing (described below), etc.

According to some embodiments, the selected stimulation parameters can be used as inputs to a neuronal model 1304 configured to predict aspects of neuronal activation resulting from the stimulation. Various models for predicting neuronal responses to stimulation are known in the art and are not described here in detail. Briefly, the models indicate where within the neural tissue stimulation is occurring, i.e., where axons are excited and where they are not. Methods for calculating a volume of activation include those described in U.S. Pat. No. 7,346,382 (McIntyre et al.), U.S. Patent Application Publication No. 2007/0288064 (Butson et al.), U.S. Pat. No. 9,867,989 (Blum et al.) and U.S. Patent Application Publication No. 2009/0287271 (Blum et al.). In certain embodiments, to calculate a volume of activation, the system uses a mathematical model of the electric field generated by the electrodes positioned adjacent the nerve. The mathematical model may be any suitable type of model that can be used to model an electric field created by an electrode, such as finite element models of the electrode(s) and the tissue medium. The electric field model can be solved for the spatial and temporal voltage distribution that represents the electric field that is created in the tissue medium by the electrode according to a particular set of electrode neuromodulation conditions. In certain embodiments, the electric field model is coupled to a neuron model to determine whether the electric potential at a given point in space is sufficient to activate neurons in the tissue medium. Another way in which the volume of activation can be determined is by calculating the second order spatial derivative of the electric potential that is distributed around the electrode. The second spatial derivative is then compared against an activation threshold. The activation threshold is the threshold value at which a neuron is activated at that particular point in space for the tissue medium. If the second spatial derivative of the electric potential exceeds the activation threshold, then the neuron at that point in space is considered to be activated. The second order spatial derivative can be calculated by numerical or approximation techniques. The neuronal model may include Hodgkin-Huxley based calculations that describe how action potentials in neurons are initiated and propagated. The model may be configured to calculate electric fields present in the neural tissue as a result of the stimulation parameters, a volume of activation (VOA), and fiber size selectivity, and the like.

According to some embodiments, the model may be configured to calculate the activation of neural elements within the modeled tissue in real time as the user inputs the stimulation parameters into the model. According to other embodiments, the model may be configured to calculate the activation associated with batches of parameters a priori and to store the calculated values in look-up tables, for example.

Figure 14:
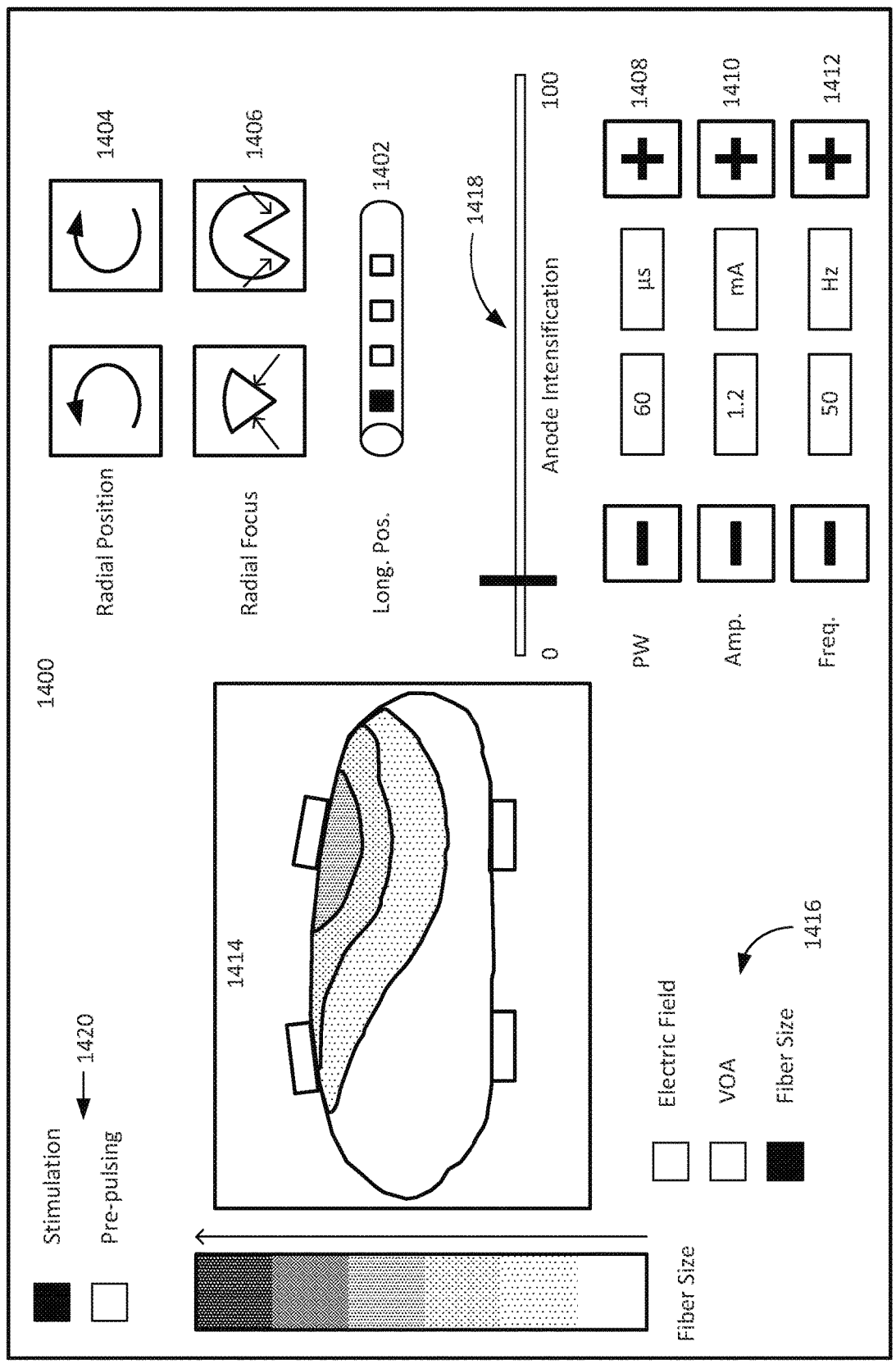
FIG. 14 shows a user interface for programming system for mapping and programming peripheral nerve stimulation.

The programming system 1300 may be configured to provide a graphical stimulation map 1306 of the modeled neural tissue and the activation resulting from the selected stimulation parameters. FIG. 14 illustrates an example of a user interface (UI) 1400 for interacting with such a model. The UI 1400 comprises various control elements for allowing the user to select and adjust the stimulation parameters. For example, the illustrated UI includes control elements for selecting the longitudinal position 1402 upon the nerve that is being programmed at a given time. The UI may also include control elements for adjusting the radial position 1404 and the radial focus 1406 of the stimulation. The radial position controls 1404 which circumferential electrodes are used and may invoke current steering to derive stimulation at virtual electrodes, as described above. Likewise, the radial focus control 1406 uses current steering to adjust the focus (i.e., broad or narrow) stimulation of the nerve. Control elements may also be provided for selecting stimulation parameters such as pulse width 1408, amplitude 1410, and frequency 1412.

The UI 1400 may include a graphical representation 1414 of the modeled nerve and may indicate various modeled responses of the neural tissue to stimulation. The UI may include control elements 1416 for selecting which neural responses to visualize. For example, the graphical representation may be configured to visualize which fiber sizes are activated, electrical fields present in the neural tissue, volume of activation, and the like. In the illustration, the fiber sizes activated using the selected stimulation parameters are shown using a false color map. Note that in the illustrated embodiment the representative nerve is somewhat flat in shape. Other shapes, such as round, may be selectable. According to some embodiments, fascicles may be represented.

The UI 1400 may include control elements for programming and adjusting anode intensification 1418. For example, the illustrated UI 1400 includes a slider bar 1418 whereby a user can adjust an amount of anode intensification from 0% (no anode intensification) to 100% (maximum anode intensification). Alternatively, the anode intensification may be adjustable based on an anode intensification ratio, as described above.

According to some embodiments, the UI 1400 may provide control elements for programming pre-pulsing. Pre-pulsing is a method of providing selectivity of particular fibers to be activated during the issuance of a stimulation pulse and is described in more detail in U.S. Pat. No. 7,742,810 (Moffitt et al.), the entire contents of which are incorporated herein by reference. Briefly, pre-pulsing involves issuing one or more electrical pulses preceding the stimulation pulse(s). Pre-pulsing can be configured to hyperpolarize fibers that are not intended to be stimulated. The hyperpolarizing pre-pulses render the fibers that are not intended to be stimulated less excitable. The following stimulation pulse(s) then depolarize the fibers that are intended to be stimulated. Thus, pre-pulsing may provide stronger selectivity between the fibers that are intended to be stimulated and those that are not. Pre-pulsing may be provided at the same or at different circumferential and/or longitudinal locations as the stimulation pulse(s). In the illustrated UI 1400 includes selector buttons 1420 for selecting whether the parameters being adjusted will apply to stimulation or to pre-pulsing.

Referring again to FIG. 13, once the parameter control elements have been used to select a set of stimulation (and possibly pre-pulsing parameters), those parameters can be transmitted to the IPG and used to stimulate the patient 1310. The programming system 1300 can be configured to receive indications of patient feedback 1312 indicating how the patient responds to the stimulation. For example, while the patient is receiving the programmed stimulation the patient may be subjected to tests or asked to complete tasks aimed at interrogating clinical effects (i.e., therapeutic effects and/or side effects) of the stimulation. The system 1300 may provide questions or tasks to put to the patient and provide control elements for ranking the patient's response. The system 1300 may also provide UI elements for selecting any therapeutic effects/side effects that are present with the selected stimulation parameters.

The programming system 1300 may also provide UI elements and/or control elements for constructing and displaying a clinical effects map 1308 based on the patient feedback. The clinical effects map may interact with (or overlay) the stimulation map. As explained above, the UI 1400 illustrated in FIG. 14 provides control elements for controlling the stimulation parameters, i.e., by manipulating the anode(s) and cathode(s) and multiple independent current sources to stimulate selected fibers within the nerve. The UI 1400 also provides the graphical representation 1414 of the modeled nerve indicating which fibers are (and are not) activated. Once the stimulation with the selected parameters is provided to the patient, the patient responses can be mapped onto the representation of the nerve, thereby correlating patient responses to the various stimulation parameters and to the activated and non-activated regions of the nerve.

Figure 15:
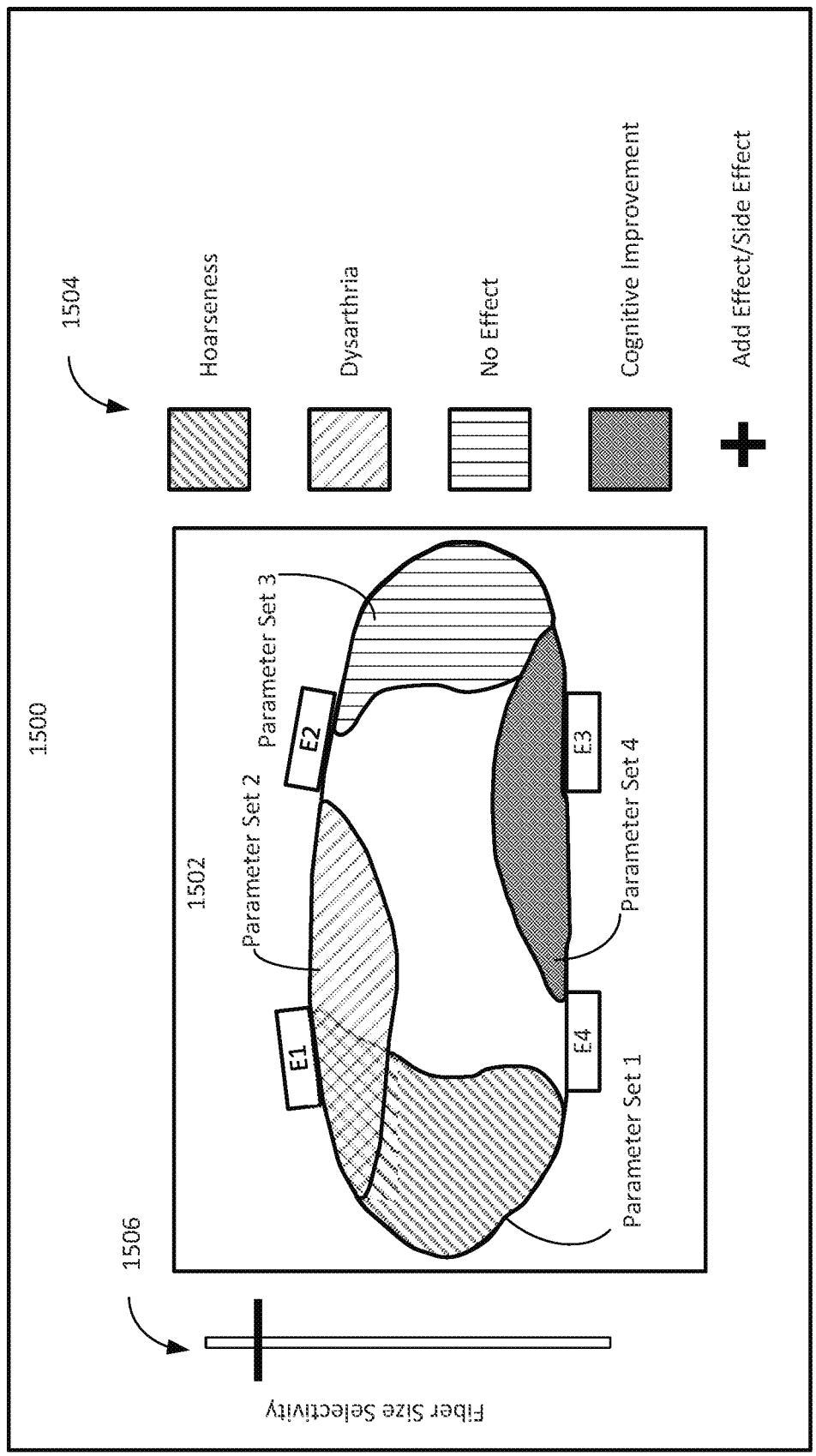
FIG. 15 shows aspects of a clinical effects map for peripheral nerve stimulation.

FIG. 15 illustrates an example of a UI 1500 for generating a clinical effects map. The UI 1500 may include a graphical representation 1502 of the nerve, which may correspond to the graphical representation 1414 (FIG. 14). A clinician may use the UIs 1400 and 1500 to map correlations between stimulation parameters, activated (or deactivated) neuronal populations, and clinical effects, as follows. Assume that the clinician has used the UI 1400 to program a first set of stimulation parameters (Parameter Set 1) and that the neuronal model has determined that Parameter Set 1 results in activation of fibers (of a certain size) located roughly between electrodes E1 and E4. Now, once stimulation according to Parameter Set 1 is provided to the patient, the patient experiences hoarseness. The clinician can then use the UI 1500 to record that clinical effect (i.e., hoarseness) onto the clinical effects map 1500, indicating that Parameter Set 1 activates fibers that result in hoarseness. For example, the UI 1500 may include buttons and/or dropdown menus 1504 listing various clinical effects/side effects that may be associated with the activated regions/fibers within the graphical representation of the nerve 1502. The clinician may be able to add buttons for additional clinical effects/side effects. Once the clinician has associated a clinical effect with the fibers activated using the Parameter Set 1, the clinician may repeat the process with additional parameter sets, which may activate other neural populations/fibers within the nerve. The effects map 1500 shown in FIG. 15 illustrates clinical effects attributed to the activation of fibers stimulated with four different parameter sets (Parameter Sets 1, 2, 3, and 4). According to some embodiments, the UI 1500 may include a control element, such as a slider bar 1506, for selecting fiber sizes associated with the observed clinical effects/side effects to be graphically represented in the clinical effects map 1500.

Referring again to FIG. 13, the programming system 1300 may also be configured to communicate with branch electrodes 1314 configured on one or more branches of the peripheral nerve. As described above, the branch electrodes can be used to sense neural action potentials evoked at one or more branches of the nerve by stimulation at the trunk level of the nerve. The branch nerve activation data can be overlayed with the stimulation map 1306 and/or the clinical effects map 1308 to determine correlations between branch activation, stimulation parameters, and trunk level neuronal activation/recruitment 1316.

Figure 16:
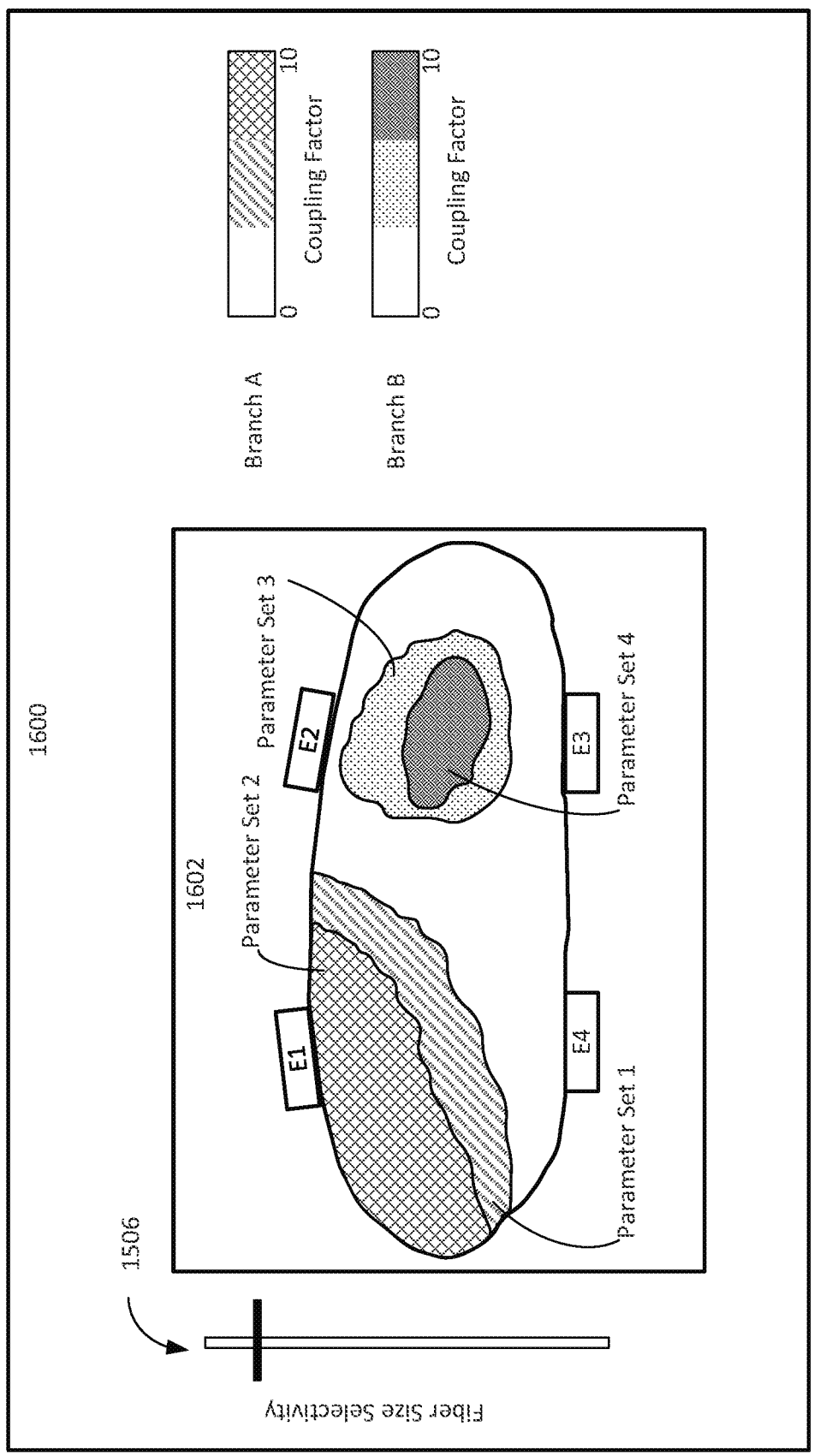
FIG. 16 shows aspects of a effects map for peripheral nerve stimulation that relates stimulation at a nerve trunk to activation of nerve branches.

FIG. 16 illustrates a UI 1600 for visualizing branch neuronal activation mapped onto areas of the trunk level of the nerve activated by selected stimulation parameters. The UI may contain a graphical representation 1602 of the trunk level of the nerve. Given a set of stimulation parameters, the neuronal model 1304 (FIG. 13) may determine the areas within the trunk level that are activated by those stimulation parameters. When the given set of stimulation parameters is provided to the patient, branch electrodes configured at one or more branches of the nerve may sense evoked action potentials. The UI 1600 can be configured to relate the amount of coupling between the activated areas of the trunk level (as determined by the neuronal model) to the amount of coupling between those areas and the nerve branch. In the illustrated UI 1600, assume that the clinician has programmed four sets of stimulation parameters (Parameter Sets 1, 2, 3, and 4). The neuronal model has calculated the regions of the trunk of the nerve that are activated by each of the parameters and displayed those regions in the graphical representation 1602 of the nerve trunk. When stimulation according to each of the parameter sets is provided to the patient, data from the branch electrodes located at Branches A and B of the nerve can be used to correlate the coupling of the determined regions of the nerve trunk to each of the branches, as shown in the graphical representation 1602. For example, the graphical representation may display a false color map or heat map correlating areas of nerve trunk activation to nerve branch activation, as shown.

Thus far, the disclosure has primarily focused on methods and systems for determining appropriate stimulation programs for peripheral nerve stimulation using fitting procedures conducted in a clinical setting, typically immediately after the patient has received their implantable stimulator system. However, some indications, such as Alzheimer's disease, require long lengths of time (e.g., 1 month, 3 months, 6 months, or a year or longer) before improvement can be observed. Program optimization on such time scales can be challenging. Thus, aspects of the disclosure relate to methods and systems for optimizing stimulation parameters in situations where the latency of the patient's response to the stimulation takes a long duration (e.g., 30 days or more) to measure. The long-term optimizations described herein are discussed with regard to optimizing stimulation to treat cognitive indications, such as Alzheimer's disease. However, the methods and systems may be generalized to optimize stimulation to treat other indications.

Figure 17:
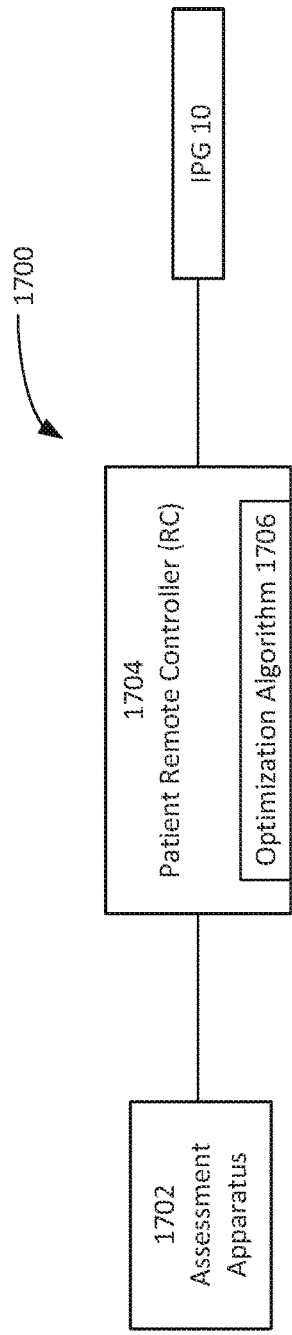
FIG. 17 illustrates aspects of a system for optimizing stimulation parameters over a long period of time.

FIG. 17 illustrates a system 1700 for optimizing stimulation parameters over a long period of time to treat cognitive disorders, such as Alzheimer's disease. The system is configured so that the patient can perform the optimization outside of a clinical setting, typically in the patient's home, for example. The system 1700 includes an assessment apparatus 1702 configured to assess one or more quantitative metrics of the patient's cognitive function. According to some embodiments, the assessment apparatus 1702 may be a computing device, such as a desktop computer, laptop computer, tablet, or the like programmed with one or more applications configured to administer a cognitive assessment to the patient. The cognitive assessment may be a series of questions or tasks aimed at assessing cognitive acuity. According to some embodiments, the assessment protocol(s) may be similar to those used by physicians in the art to assess cognitive state, such as the mini mental state exam (MMSE). According to some embodiments, the assessment apparatus 1702 may be a bespoke simplified computing device, for example, comprising a screen and one or more simple UI controls, such as knobs or buttons, aimed at limiting the degrees of freedom while performing the assessment. For example, the patient may be tasked with sorting objects presented on the screen or manipulating geometric objects on the screen using the simplified UI controls. According to other embodiments, the assessment apparatus 1702 may be a general computing device, such as a personal computer, laptop computer, tablet, smartphone, or the like, executing software to implement the assessment of the patient's cognitive state.

According to some embodiments, the patient periodically engages in an assessment to determine their cognitive function using the assessment apparatus 1702. For example, the patient may engage in an assessment once or twice per day. Each time the patient engages in an assessment, the assessment apparatus 1702 generates one or more quantitative metrics M of patient's cognitive function. The generated metrics M are used in an algorithm for optimizing the patient's stimulation parameters over time, as described below. According to some embodiments, the metric values M are not visible to the patient or caregiver, to avoid bias or discouragement.

According to some embodiments, the quantitative metric values M are provided to the patient's external remote controller (RC) 1704 for their stimulator device. As is well known in the art, patient's having an implantable medical device system, such as shown in FIG. 2, are typically issued an RC for controlling their device. The RC 1704 can be as described in U.S. Patent Application Publication 2015/0080982 for example, and may comprise a dedicated controller configured to work with the IPG 10 (FIG. 2). The RC 1704 may also comprise a general-purpose mobile electronics device such as a mobile phone which has been programmed with a Medical Device Application (MDA) allowing it to work as a wireless controller for the IPG 10, as described in U.S. Patent Application Publication 2015/0231402. The RC 1704 includes a user interface (UI), preferably including means for entering commands (e.g., buttons or selectable graphical icons) and a display.

The RC 1704 can have one or more antennas capable of communicating with the IPG 10. For example, the RC 1704 can have a near-field magnetic-induction coil antenna capable of wirelessly communicating with a coil antenna in the IPG 10. The RC 1704 can also have a far-field RF antenna capable of wirelessly communicating with an RF antenna in the IPG 10, if the IPG is so equipped.

The RC 1704 can also have control circuitry such as a microprocessor, microcomputer, an FPGA, other digital logic structures, etc., which is capable of executing instructions. The control circuitry can for example receive patient adjustments to stimulation parameters, and create a stimulation program to be wirelessly transmitted to the IPG 10.

According to some embodiments described herein, the RC 1704 may comprise an optimization algorithm 1706. The optimization algorithm 1706 may be embodied as instructions contained within non-transitory computer readable media within the RC. The instructions, when executed by the control circuitry of the RC, operate as described below to facilitate optimizing the stimulation parameters provided to the patient's IPG 10.

As mentioned above, the assessment apparatus 1702 provides the quantitative metric values M indicating the patient's cognitive function to the RC 1704. According to some embodiments, the metric values may be entered by hand into the RC via the UI of the RC. According to some embodiments, the assessment apparatus may telemeter the metric values to the RC via wired or wireless communication, such as Bluetooth, Wi-Fi, or the like. According to some embodiments, the patient's interactions with the assessment apparatus may be transmitted to a remote location via an internet connection where they are processed and the metric values may be transmitted to the RC, also through an internet connection, for example. Once received by the RC, the metric values are used as inputs for the optimization algorithm 1706. Changes in stimulation parameters can be transmitted to the patient's IPG 10, as is known in the art.

Figure 18:
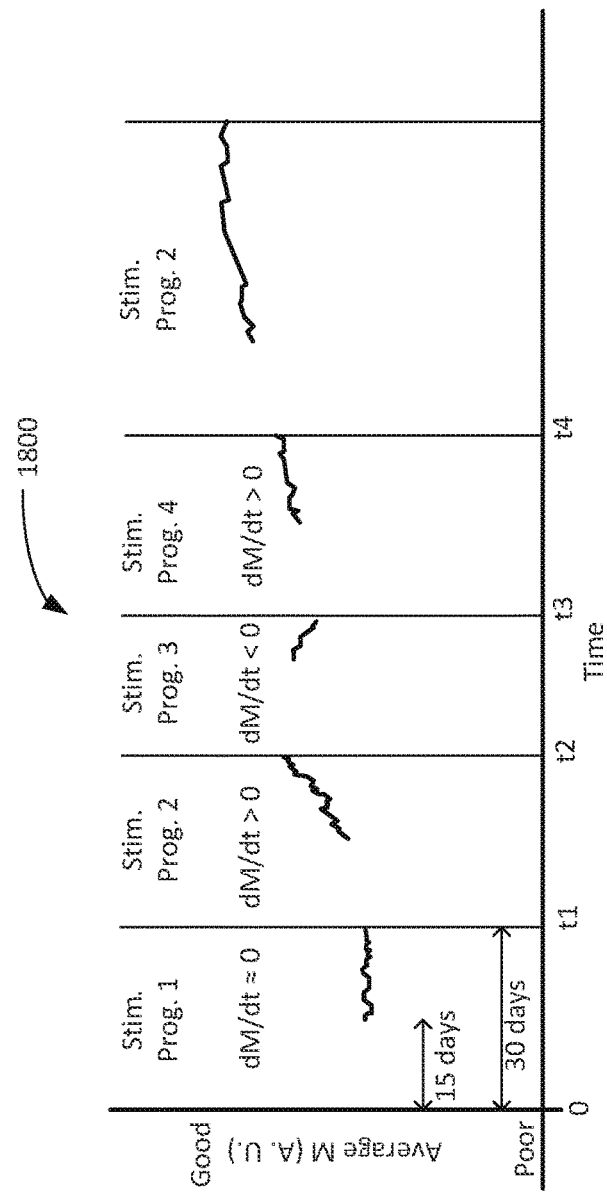
FIG. 18 shows a timeline graphically illustrating one embodiment of how the optimization algorithm may optimize stimulation parameters over a duration of about 160 days.

FIG. 18 shows a timeline 1800 graphically illustrating one embodiment of how the optimization algorithm may optimize stimulation parameters over a duration of about 160 days. The duration could be any time period, but is typically multiple days, weeks, or months. In the timeline 1800 time is represented on the horizontal axis and the average M value (in arbitrary units) is represented on the vertical axis. At time 0, the patient begins receiving stimulation according to a first stimulation program (Stim. Prog. 1). The patient also begins engaging in cognitive assessments (e.g., once a day, twice a day, every other day, etc.). Following each cognitive assessment, the quantitative metric value M is provided to the optimization algorithm, which begins accumulating a running average M value over a time window, in this case, a 15-day running average. Other statistical analyses, such as median M values, etc., could be used as well. Likewise, the time period for accumulating the running average may vary.

At some point (e.g., after 15 days) there is enough data for the moving window to release a metric data point, and it does so repeatedly as additional data is accrued and window slides. The algorithm then determines the change in the metric value over time (dM/dt). In the timeline 1800, the metric value did not change significantly with stimulation according to Stim. Prog. 1 (dM/dt~0), which may be viewed as good (absence of degeneration) or bad (absence of improvement), depending on the expectation. At time t1, a second stimulation program (Stim. Prog. 2) is used and process is repeated. Notice that in the timeline 1800, dM/dt is greater than 0 for Stim. Prog. 2, indicating that the patient's cognitive state improved using that program. At t3 a third stimulation program (Stim. Prog. 3) is used and the process is repeated. Notice that with Stim. Prog. 3, dM/dt is less than 0, indicating that the patient's cognitive state deteriorated using that program and that the time period with that program was cut short. According to some embodiments, the optimization algorithm may terminate a trial program if the patient's cognitive function deteriorates. With Stim. Prog. 4 the patient's cognitive function improved, but not as much as with Stim. Prog. 2. Since Stim. Prog. 2 was found to be the most effective, at time t4 the algorithm selected Stim. Prog. 2 to use for ongoing therapy and the cognitive state continued to improve for some time before leveling off It should be noted that the time periods, i.e., the time between 0 and $t_1$, $t_1$ and $t_2$, etc., may be any length of time. Typically, the time periods are multiple days or multiple weeks.

The timeline 1800 illustrated in FIG. 18 is an example of a 1-dimensional optimization wherein the stimulation programs differ with respect to one stimulation parameter, for example, electrode configuration (i.e., circumferential location of the stimulation electrode), pulse width, frequency, amplitude, etc. Higher dimensional optimizations could be used to optimize multiple parameters simultaneously, but the optimization process would be more computationally intensive and take longer. Various optimization methods may be used, such as single optimum methods, for example, simplex methods, gradient descent-based methods, and the like. Alternatively, local/global min/max methods could be used, for example genetic algorithm methods, particle swarm optimization (PSO) methods, etc. According to some embodiments, the user may define search boundaries for the parameters to be optimized to prevent evaluation of excessively large or small parameter values.

Although particular embodiments of the present invention have been shown and described, it should be understood that the above discussion is not intended to limit the present invention to these embodiments. It will be obvious to those skilled in the art that various changes and modifications may be made without departing from the spirit and scope of the present invention. Thus, the present invention is intended to cover alternatives, modifications, and equivalents that may fall within the spirit and scope of the present invention as defined by the claims.

What is claimed is:

1. As system for electrically stimulating a peripheral nerve, the peripheral nerve comprising a trunk and a plurality of branches, the system comprising:
    an electrical stimulator,
    a plurality of trunk electrodes each configurable at different circumferential locations about the trunk,
    one or more recording electrodes each configurable proximate to one or more of the plurality of branches, and
    control circuitry configured to:
        send instructions to the stimulator to cause the stimulator to deliver electrical stimulation to the trunk using one or more of the plurality of trunk electrodes, wherein delivering the electrical stimulation comprises:
            delivering a first electrical stimulation that selectively recruits a first population of neural elements within the trunk, and
            delivering a second electrical stimulation that selectively recruits a second population of neural elements within the trunk,
        cause the one or more recording electrodes to record action potentials evoked by the first and second electrical stimulations at at least one of the plurality of branches, and
        determine an amount of coupling of the first population of neural elements and the second population of neural elements with the at least one branch based on the sensed action potentials.

2. The system of claim 1, wherein the plurality of trunk electrodes comprises at least three trunk electrodes each configured at different circumferential locations about the trunk.

3. The system of claim 1, wherein the first electrical stimulation and the second electrical stimulation are each delivered at different circumferential locations about the trunk.

4. The system of claim 1, wherein recording action potentials at at least one of the plurality of branches comprises recording action potentials at two or more branches.

5. The system of claim 1, wherein recording action potentials at at least one of the plurality of branches comprises sensing electrical potentials at least one of the plurality of branches using one or more branch electrodes.

6. The system of claim 5, wherein the one or more branch electrodes comprise percutaneous electrodes, implanted electrodes, or transdermal electrodes.

7. The system of claim 1, wherein delivering either, or both of, the first and second electrical stimulations comprises using current steering to deliver electrical stimulation at a location between at least two trunk electrodes.

8. The system of claim 1, wherein the plurality of trunk electrodes further comprises at least two electrodes at different longitudinal locations along the trunk.

9. The system of claim 1, wherein the plurality of trunk electrodes comprises:
    a first longitudinal set of electrodes configured at a first longitudinal location along the trunk,
    a second longitudinal set of electrodes configured at a second longitudinal location along the trunk, and
    a third longitudinal set of electrodes configured at a third longitudinal location along the trunk.

10. The system of claim 9, wherein delivering either, or both of, the first and second electrical stimulations comprises:
    selecting an electrode of the first longitudinal set of electrodes as a first local anode, selecting an electrode of the second longitudinal set of electrodes as a second local anode, and selecting an electrode of the third longitudinal set of electrodes as a local cathode, sourcing electrical current from the two local anodes into a target neural region of the trunk, sinking a first portion of the electrical current from the target neural region into the local cathode, and sinking a second portion of the electrical current into at least one cathode remote from the target neural region.

11. The system of claim 10, wherein a ratio of the sourced electrical current over the first portion of the sunk electrical current has a value that allows the first population of neural elements or the second population of neural elements to be recruited.

12. The system of claim 1, further comprising:

one or more electrode leads, wherein each electrode lead is configured to be placed, at least partially, around the nerve, each of the electrode leads comprising two or more electrodes configured such that each electrode is at a different circumferential location about the nerve, and an implantable pulse generator (IPG) configured to provide electrical stimulation to the electrodes.

13. The system of claim 12, wherein the one or more electrode leads comprise cuff electrode leads.

14. The system of claim 12, wherein the one or more electrode leads comprise helical electrode leads.

15. The system of claim 1, wherein the peripheral nerve is a vagus nerve.

\* \* \* \* \*